United States Patent [19]

Pepping et al.

[11] 4,146,749

[45] Mar. 27, 1979

[54] TELECOMMUNICATIONS NETWORK HAVING MULTI-FUNCTION SPARE NETWORK BLOCK

[75] Inventors: Bernard J. Pepping, Downers Grove; Satyan G. Pitroda, Villa Park; Byung C. Min, Bolingbrook, all of Ill.

[73] Assignee: Wescom Switching, Inc., Oak Brook, Ill.

[21] Appl. No.: 833,954

[22] Filed: Sep. 16, 1977

[51] Int. Cl.² .......................................... H04Q 11/04
[52] U.S. Cl. .......................... 179/15 AT; 179/15 AQ
[58] Field of Search .......... 179/15 AQ, 15 AT, 15 A, 179/15 BA, 18 ES

[56] References Cited

U.S. PATENT DOCUMENTS 3,959,596   5/1976   Bojanek et al. ................ 179/15 AT

*Primary Examiner*—Thomas A. Robinson
*Attorney, Agent, or Firm*—Leydig, Voit, Osann, Mayer & Holt, Ltd.

[57] ABSTRACT

In a telecommunications switching system having an "all time" network, the network is divided into a plurality of blocks, each of the blocks having assigned thereto dedicated groups of access ports for completing connections between those ports and any of the other ports in the system. A single spare network block is provided having a programmable identity and capable of functioning in the place of any of the primary blocks. In the event of a malfunction in a primary block, the spare network block is assigned the identity of the primary block, is enabled, the faulty block disabled, and call processing continues just as if the primary block were on line.

13 Claims, 14 Drawing Figures

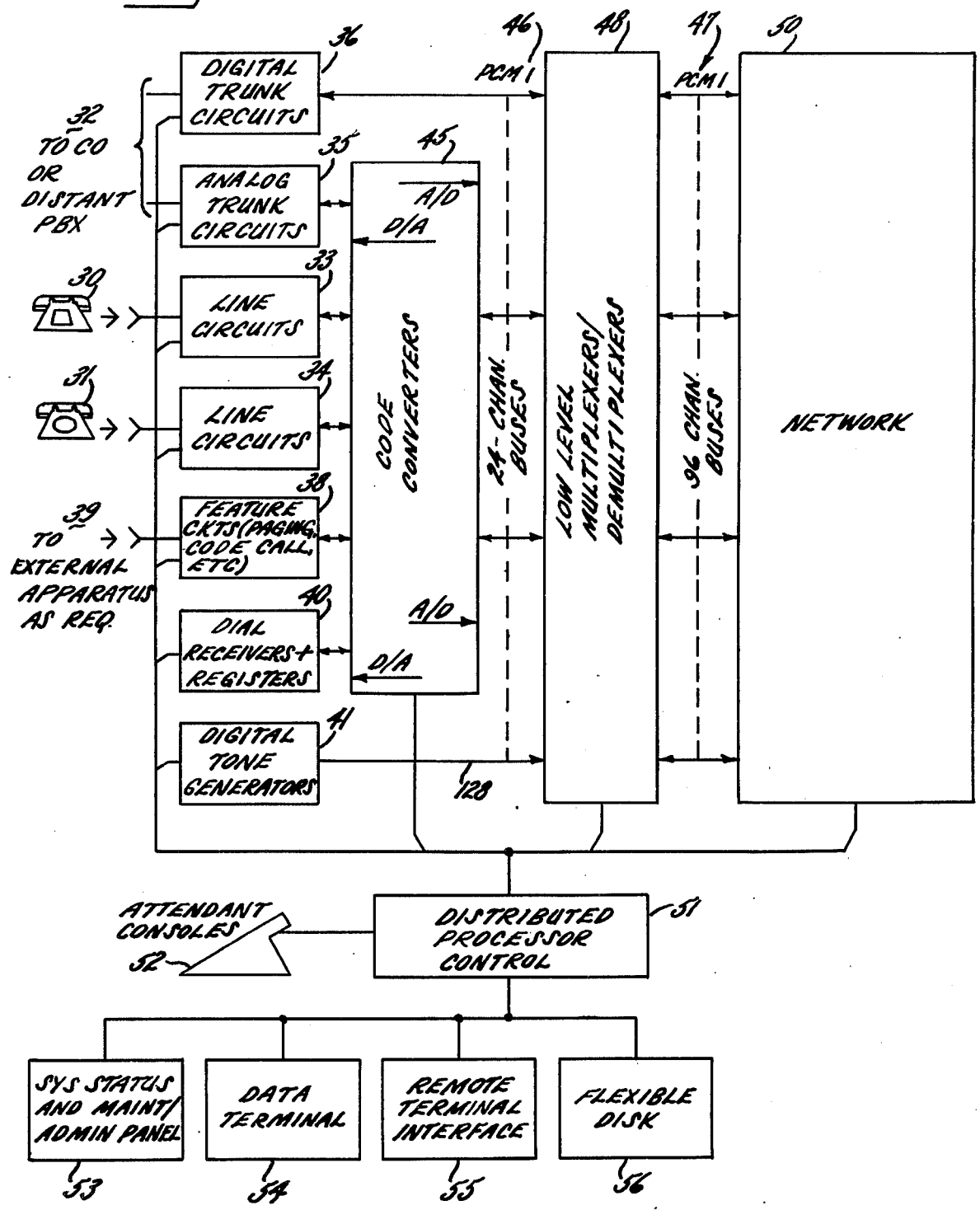

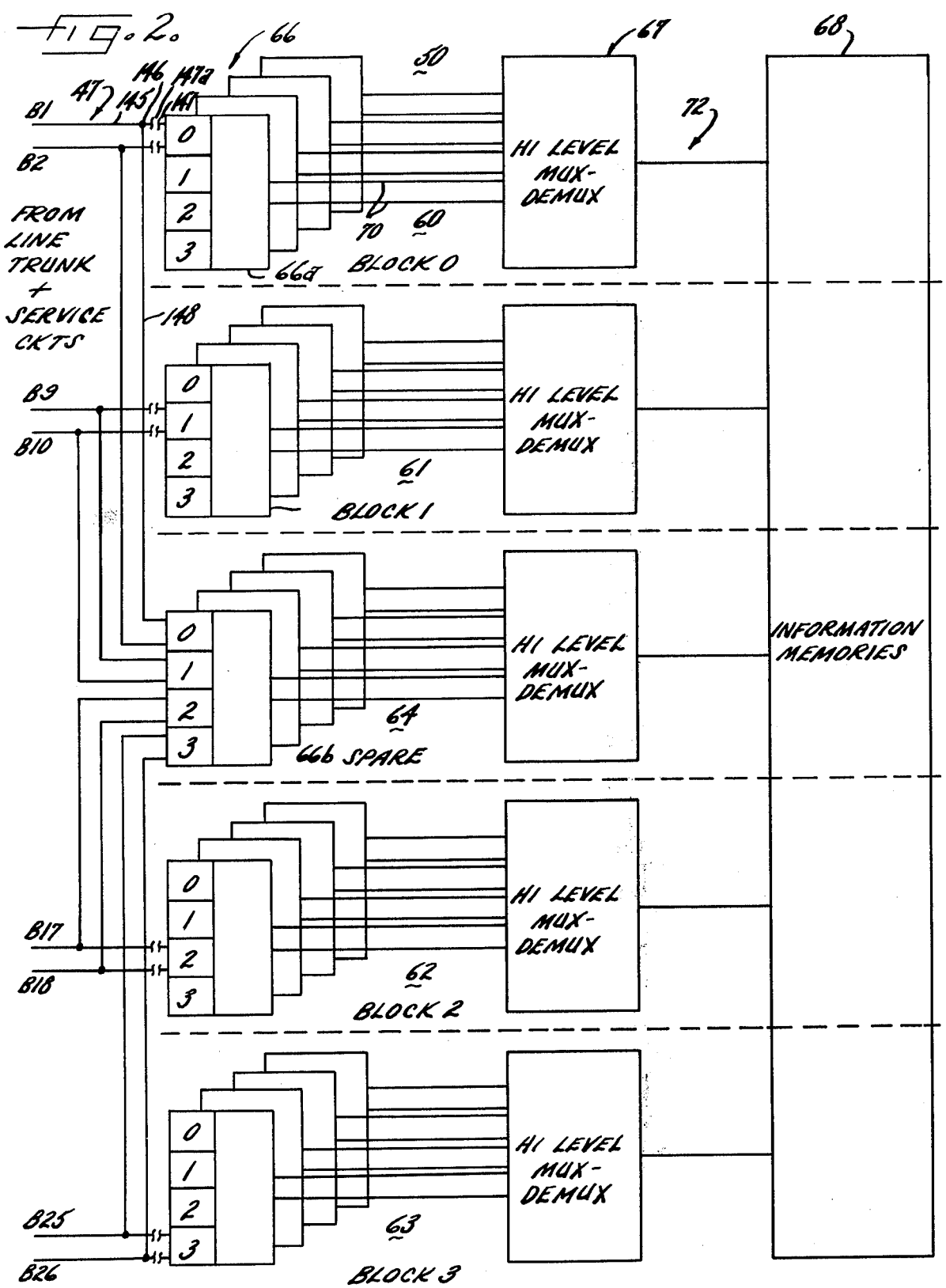

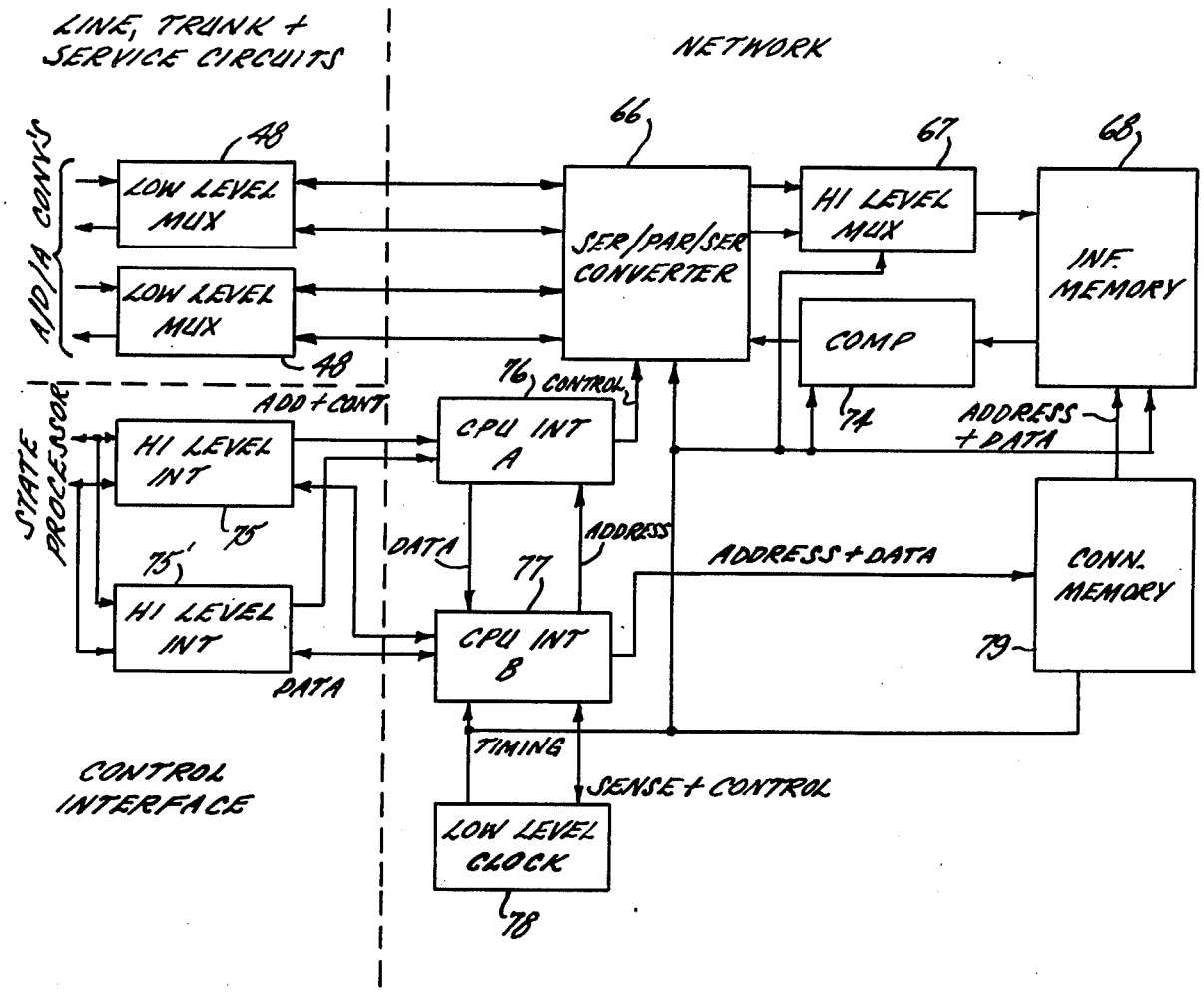

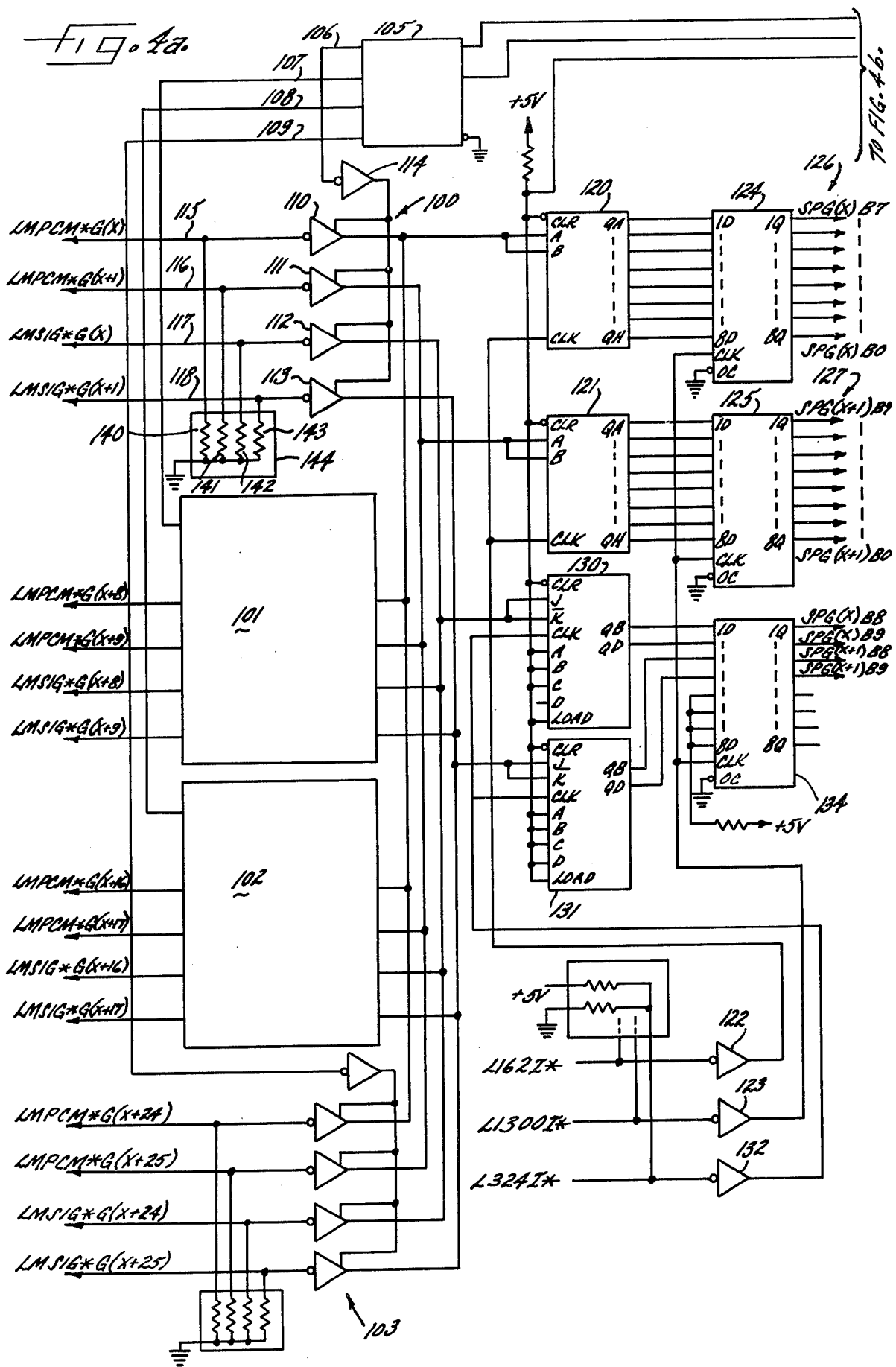

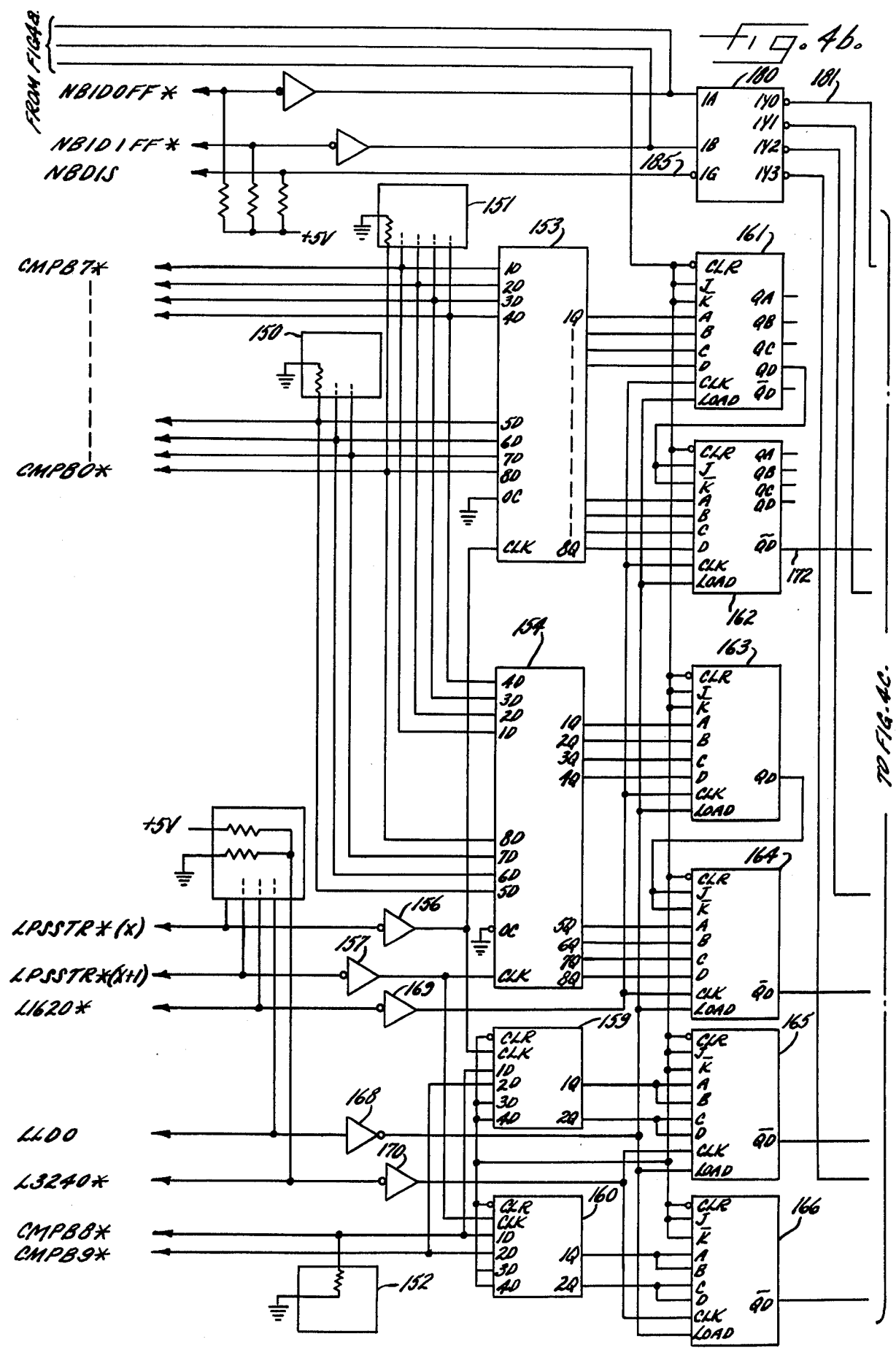

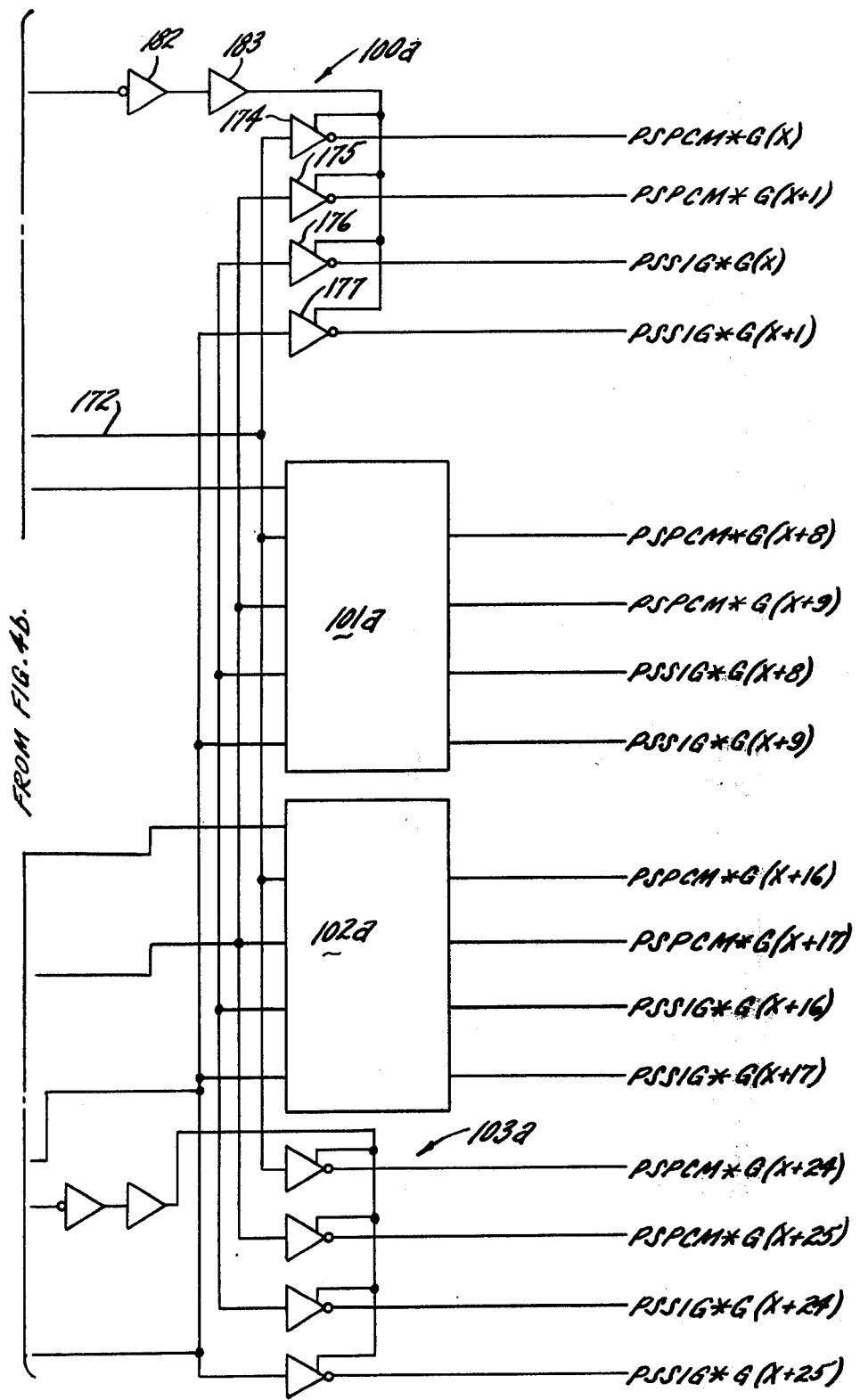

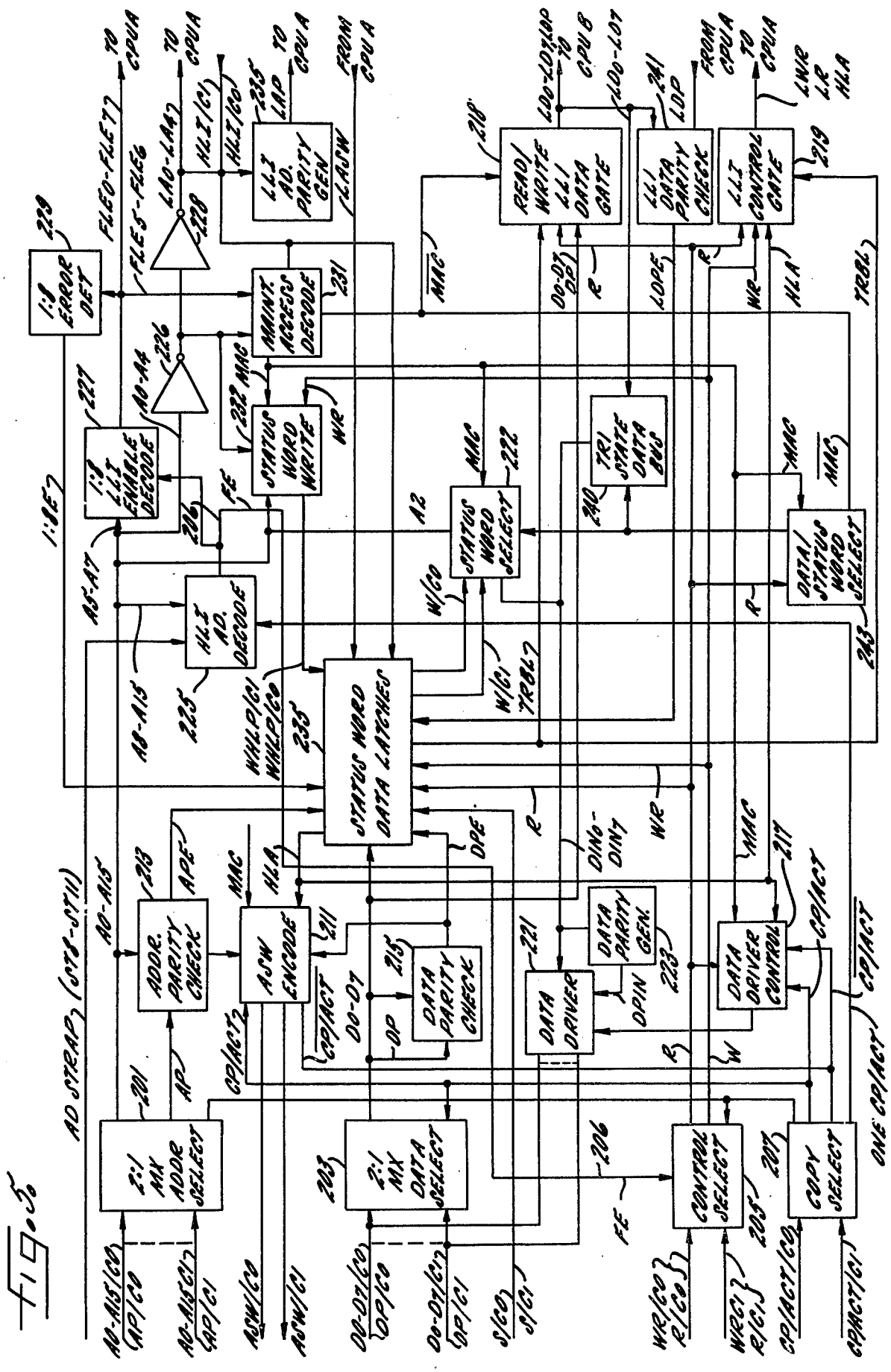

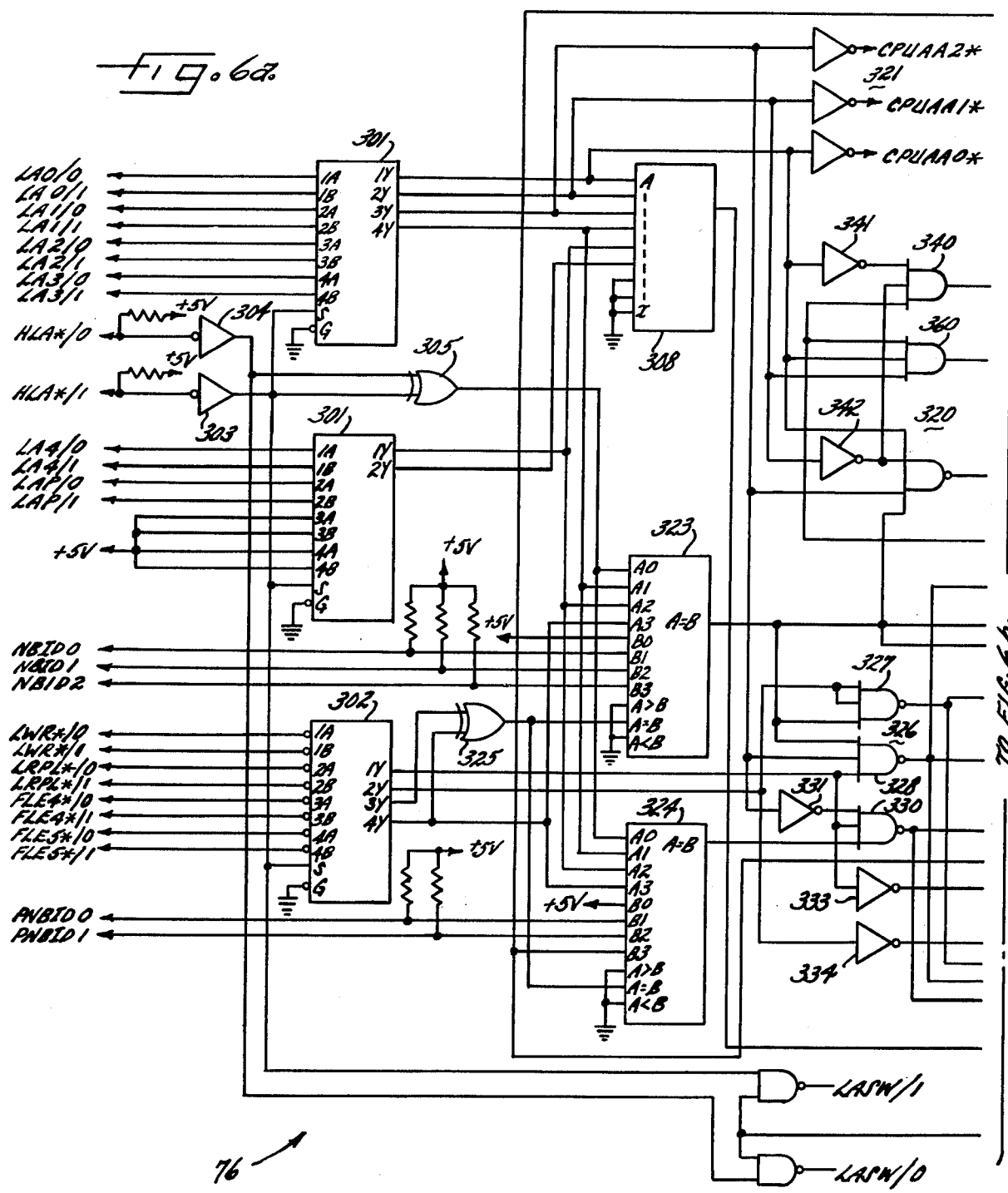

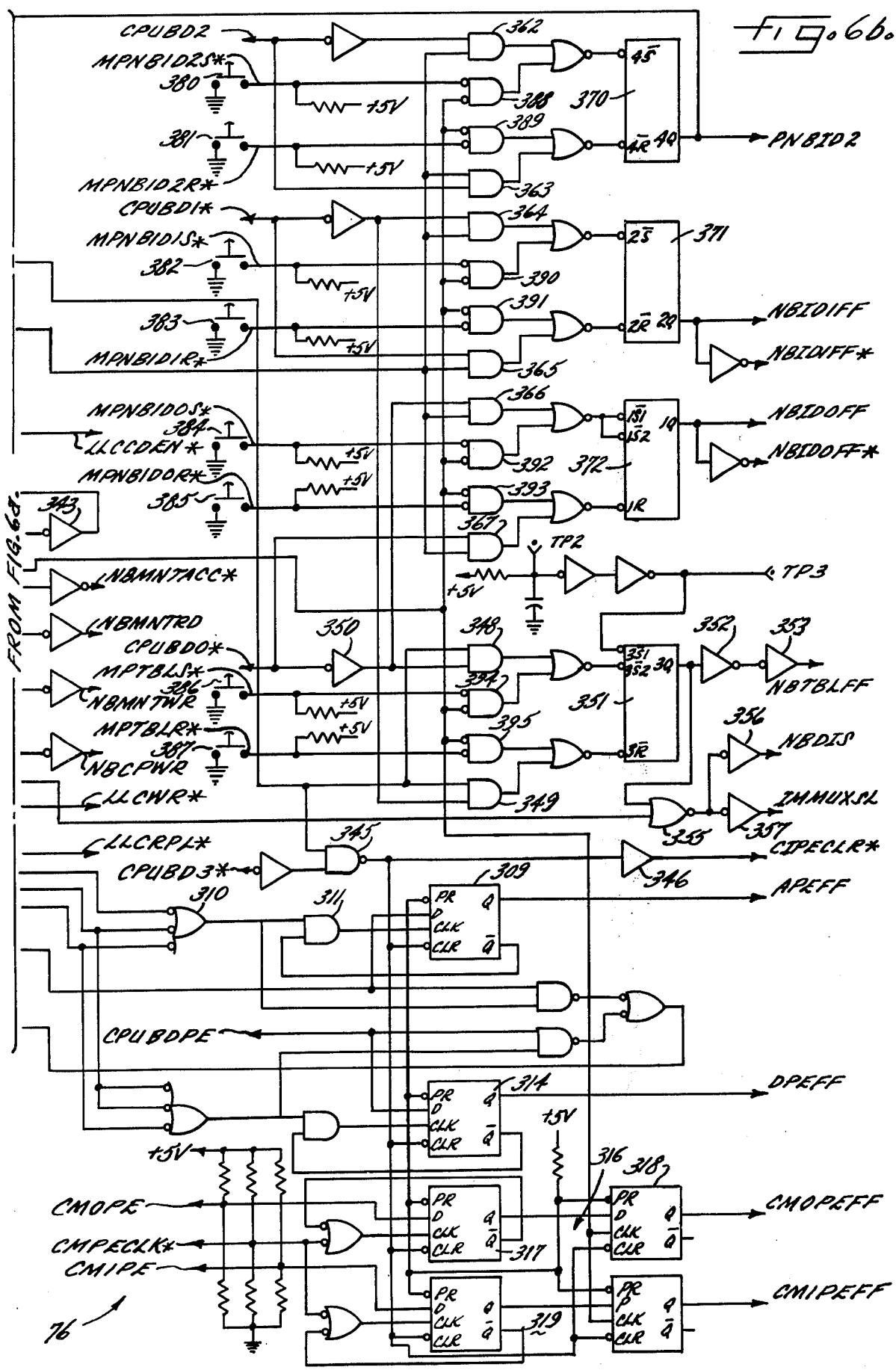

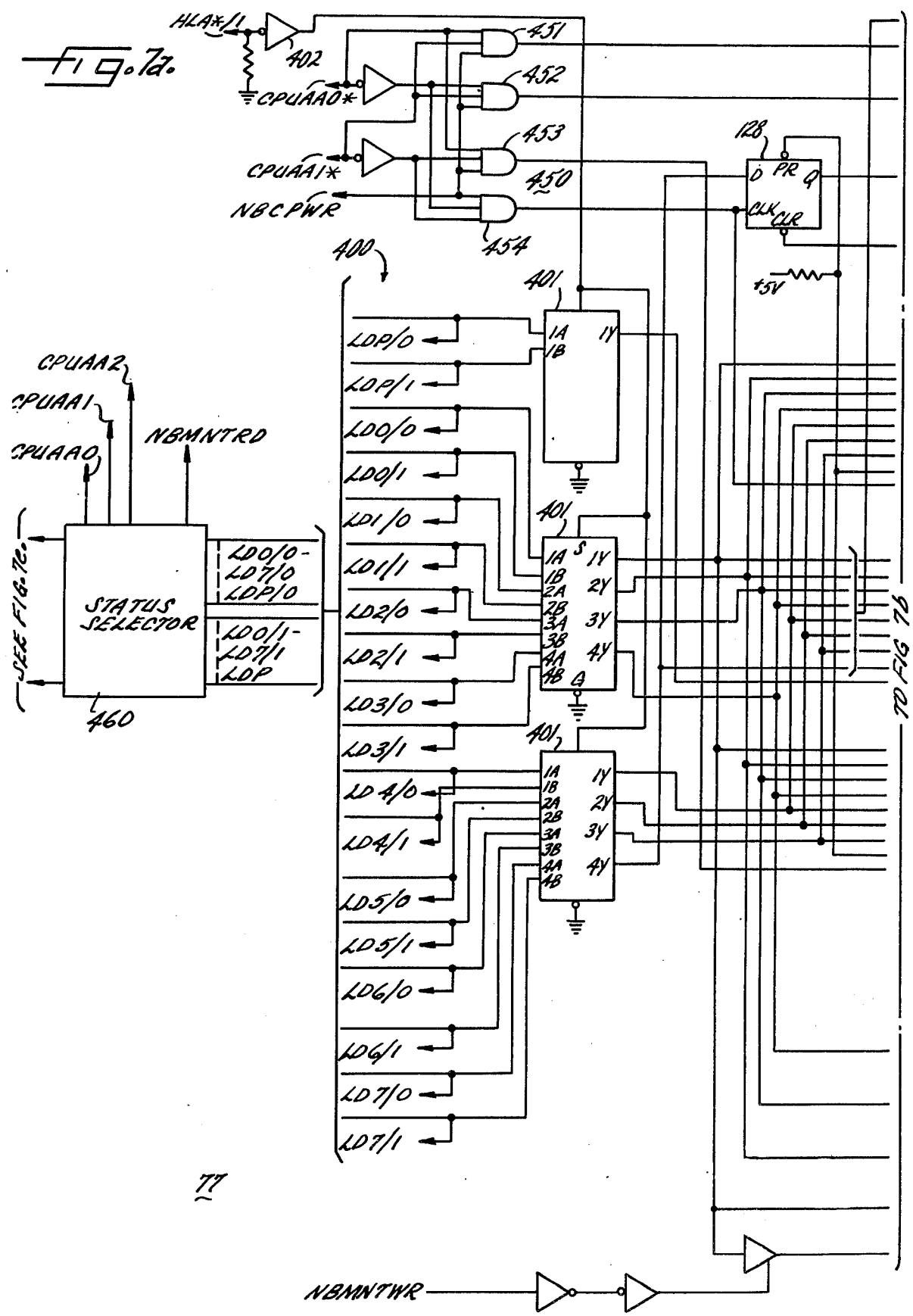

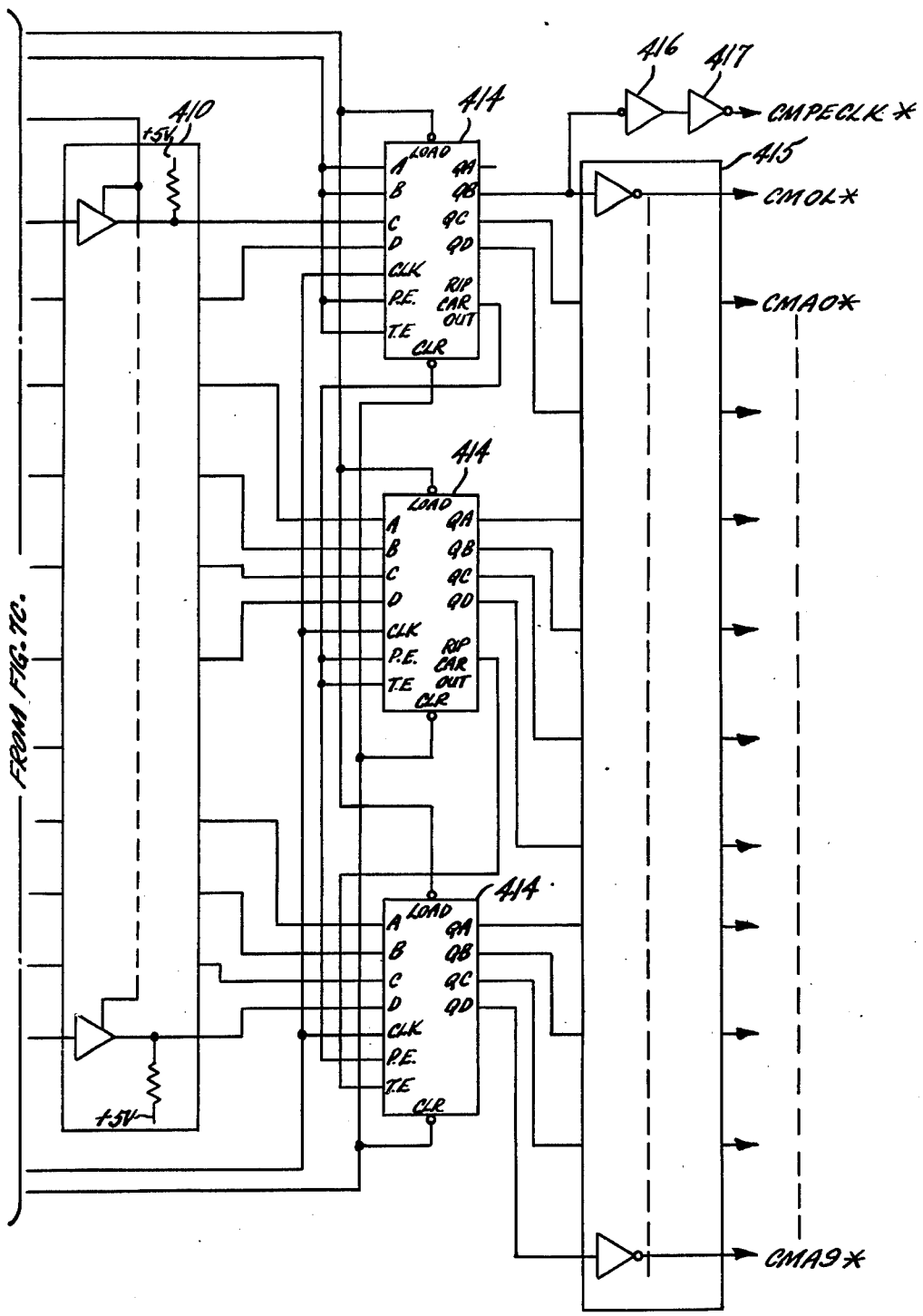

| ADDRESS A2 A1 A0 | 7 | 6 | DATA 5 | 4 | 3 | 2 | 1 | 0 |
|---|---|---|---|---|---|---|---|---|
| 0 0 0 | — | — | HIGH ORDER ADDRESS REGISTER ID2 O/I | CMO1 CM1 | ID1 | ID0 | A9 | A8 |
| 0 0 1 | A7 | A6 | A5 | A4 | A3 | A2 | A1 | A0 |
| 0 1 0 | — | PHI | HIGH ORDER DATA REGISTER D12 | D11 | D10 | D9 | D8 | D7 |
| 0 1 1 | F | P1O | LOW ORDER DATA REGISTER D5 | D4 | D3 | D2 | D1 | D0 |
| 1 0 0 | CM1 PE FF | CM0 PE FF | CZ1 PE | CZ0 PE | DPE FF | APE FF | PRI/ SPARE BLK | NB TBL FF |
| 1 0 1 | | | LOW LEVEL CLOCK | | | LLC EFF | | LLC TBFF |
| 1 1 0 | — | — | — | — | — | — | — | — |
| 1 1 1 | — | — | — | — | — | PNB ID2 | PNB ID1 | PNB ID0 |

Fig. 7c.

TELECOMMUNICATIONS NETWORK HAVING MULTI-FUNCTION SPARE NETWORK BLOCK

This invention relates to telecommunications switching systems, and more particularly to the network portion of such systems where connections between the various ports are completed.

The ultimate purpose of the telephone switching network is to connect two or more terminals. Cross bar switches, reed switches and the like which actually complete metallic circuits are well known, readily understandable and have crosspoints which are not overly difficult to troubleshoot. The present invention relates to an "all time" switch, that is, one wherein samples of information are received, stored, delayed in time then transmitted, such that the samples are switched from one time slot to another for effecting communication between the terminals assigned to those time slots. Such networks, rather than using metallic contacts, use semiconductor memories for storing the samples as they are sequentially received, and for reading out the stored information under the control of additional semiconductor memories (known as connection memories) to swap samples between time slots for the purpose of communicating between terminals assigned to those slots. In this type of system samples from a whole array of access ports at the input are channeled down to a very small number of busses in the network for switching and then demultiplexed after switching for distribution to the ports. Because of the density of information at the network, a failure therein may disable all or a very major portion of the entire switching exchange.

In order to minimize the possibility of disabling the switching system in that fashion, many large central office type switching exchanges have been configured with redundant networks such that if a primary fails the backup is immediately put on line. In those systems, either the entire network is duplicated or if the network is configured in blocks, each block is duplicated such that a dedicated backup is provided for each primary. In that kind of system each spare block has an identity which is the same as the primary for which it exists. The spare may, for example, be operated in parallel with the primary such that connections are written to both. Another approach would be to provide a dedicated DMA channel between primary and secondary such that if the primary is disabled the memory contents thereof may be transferred by a DMA operation to the spare.

Because complete duplication of a network involves considerable hardware and therefore considerable extra cost, in many smaller switching systems it has not been feasible to provide backup network equipment.

In view of the foregoing, it is a general aim of the present invention to economically provide a switching network of enhanced reliability while avoiding the need to completely duplicate the network. More specifically, it is an object to provide a network having a plurality of primary blocks and only a single spare network block, the identity of the spare block being programmable to assume the identity of any of the primary blocks.

In greater detail it is a further object to configure the primary and spare blocks such that replacement is effected at a point in the multiplexing/demultiplexing scheme where redundancy has the greatest effect on overall system reliability. More specifically, it is an object to configure the multiplexing/demultiplexing scheme to accomplish multiplexing in two stages, and to include the second or higher order stage in the network, such that it is backed up by the spare block.

Other objects and advantages will become apparent from the following detailed description when taken in conjunction with the drawings in which:

FIG. 1 is a general block diagram illustrating a telecommunications switching system forming an exemplary environment for the network according to the present invention;

FIG. 2 is a block diagram illustrating the overall architecture of the network;

FIG. 3 is a block diagram illustrating the relationship between the network, its control and associated portions of the switching system;

Figure 7B:
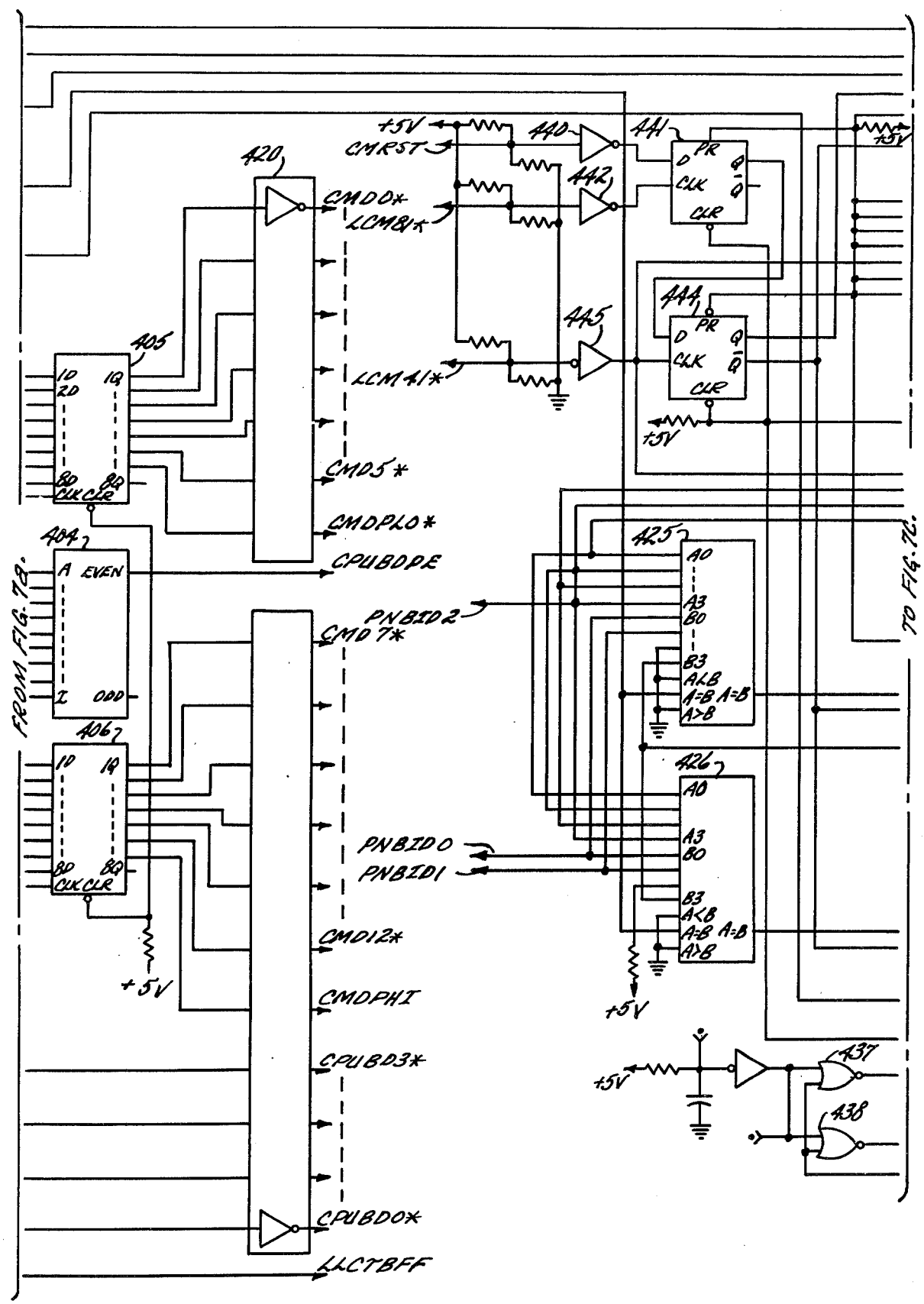

FIGS. 4a-c form a logic diagram of the serial to parallel to serial converter;

FIG. 5 is a block diagram of the high level interface circuit;

FIGS. 6a-b form a logic diagram of the CPU A interface circuit; and

FIGS. 7a-e form a logic diagram of the CPU B interface circuit.

While the invention will be described in connection with certain embodiments presently considered to be preferred, there is no intent to limit it to those embodiments. On the contrary, the intent is to cover all alternatives, modifications and equivalents included within the spirit and scope of the invention as defined by the appended claims.

Turning now to the drawings, FIG. 1 shows in block diagram form a telephone switching system which provides an exemplary environment for a network according to the present invention. The system is adapted for connection to a plurality of lines represented by telephone instruments 30, 31, and to a plurality of trunks generally indicated at 32. The general term access ports will be used herein to denote the switching system inputs which are available for these and other such input devices. Circuitry is provided to interface the access ports to the switching systems, such circuitry being represented by line circuits 33, 34, analog trunk circuits 35 and digital trunk circuits 36. Since the switching system is of the four wire variety, the line circuits 33, 34 and the analog trunk circuits which are connected to two wire trunks include hybrids for converting the two wire line signals to four wire for use by the switching system.

In addition to the line and trunk equipment which is connected to the access ports, the system is capable of servicing additional equipment to provide special features, such features being represented by element 38. For example, the system may be configured to provide paging, code call, multi-port conferencing and the like. Additional apparatus as required, for example audio equipment for use with the paging feature, is indicated generally at 39.

In the illustrated embodiment, also treated as connected to access ports are dial receivers and registers 40 which receive and interpret dialed numbers, and digital tone generators 41 which produce progress tones as required by the system.

As suggested earlier, the switching system is configured as a four wire digital time switch and therefore requires conversion of the analog information presented to the analog access ports to digital format. To that end, a plurality of code converters are provided, indicated generally at 45. In the preferred embodiment, the code which is utilized is the standard D2/D3 PCM code using an 8 bit format, a 1.544 megabit transmission rate and a compression ratio having $\mu = 235$. The code converter block 45 may therefore be implemented using a plurality of rather conventional T1 PCM code converters, each capable of handling 24 channels. It is also preferable to modify the system by providing two additional bits in each word, the 9th bit for signaling and the 10th bit for parity. One practical embodiment of the illustrated switching system is intended to handle a maximum capacity of 3,088 channels, 3,072 active and 16 lost to framing. FIG. 1 illustrates such a system, showing a bus structure 46 comprising 128 busses each carrying 24 channels of digital information to a low level multiplexer 48. The low level multiplexer continues to converge the information which originated at the plurality of separated access ports toward the network. It combines groups of four of the 24 channel busses 46 into a 96 channel serial bus structure 47. In the system of the size illustrated, 32 of the 96 channel busses are provided, those busses being routed to the network 50 where connections between the various access ports are effected.

In the physical implementation of the system, the input circuits, code converters and low level multiplexers will not be segmented into separate blocks as suggested in FIG. 1, but will be intermixed along functional lines to minimize wiring between cards in producing the 96 channel busses. For example, in the equipment frame which services the line circuits, a plurality of files are provided, each file including four code converters and the necessary line circuits to support the four code converters along with one low level multiplexer such that each file in that frame is capable of supporting one of the 96 channel busses. The busses are in the form of cables which are then routed from each file to the equipment frame which houses the network circuitry. In some cases, such as in the trunk circuits it may take two files to produce 96 channels of information, but even in those cases the equipment is segmented with a view toward each segment servicing one of the busses which serve as inputs to the network. With the equipment configured in that way, the failure of a single line or trunk circuit affects only that line or trunk, the failure of a code converter affects only 24 channels, and the failure of a low level multiplexer affects a particular 96 channels, which is only 3% of the total system. As a result, a failure of any of those elements, although important, is not extremely significant as to the health of the overall switching system. However, as the information continues to converge toward the network, the failure of an element beyond the 96 channel serial level has an ever increasing impact on the overall health of the system. Accordingly, backup equipment is provided for the equipment beyond the 96 channel level as will be described in greater detail below.

Before moving on to that facet, attention will be first directed to the switching system common control which, in the illustrated embodiment, is a distributed multiprocessor control complex 51, described in greater detail in Pitroda et al. U.S. patent application Ser. No. 734,732 (now abandoned) entitled Microprocessor Control Complex. As shown in FIG. 1 the distributed processor control 51 has circuit connections to the elements described thus far for causing those elements to perform the function of the switching exchange. As a generality, the control complex keeps track of the current status of each access port in the system, detects requests for service, and determines next state for each of the access ports, and effects changes from one state to another, such as by writing connections in the network.

For the sake of completeness FIG. 1 shows attendant consoles 52 coupled to the distributed processor control for allowing an attendant to monitor system connections, establish new connections and the like. A system status and maintenance panel 53 is a troubleshooting aid and provides the ability to display the status of particular equipment as well as the ability to reconfigure the system manually. A data terminal 54 provides a port for entry of information into the processor complex 51 as well as output of information therefrom. A remote terminal interface 55 provides similar capabilities to a station at a remote site. Finally, a flexible disc 56 carries the entire program for the system and may be actuated in the event the software loses its sanity to reload the program in order to place the system back on line.

Turning now to FIG. 2, there is shown the general architecture of the network 50, comprising four primary blocks 60–63, and a spare block 64. The network inputs, as well as its outputs are considered, in the present case, to be the 96 channel serial bus structure 47 which carries information to and from the line, trunk and service circuitry. In the illustrated embodiment serial to parallel to serial converter means, generally indicated at 66, serves as the network input and output for servicing the bus structure 47. The converters feed respective high level multiplexers 67, which further converge the digital information toward the switching elements, the information memories 68 which operate under the control of the connection memories in such "all time" switches.

In the illustrated embodiment each of the network blocks is capable of handling 768 channels of information. To efficiently accommodate that capacity, the serial to parallel to serial converter of each block is configured as four cards, each card capable of handling two of the 96 channel busses. Accordingly, each block handles 8 of the 96 channel busses, providing as an input to the information memory a bus carrying information from 768 channels.

Referring to converter card 66a of block 0, it is seen that the card is segmented into four sections 0-3 at the low level end, the 0 block having 96 channel busses B1, B2 connected thereto, and having a common section at the high level end providing two output busses 70 to the high level multiplexer 67. Each of the remaining cards in block 0 is connected in the same manner to service the 96 channel busses B3-B8. In block 1, the 1 section of the converter card is used, in block 2, the 2 section and in block 3, the 3 section. The spare network block converter cards have all four sections connected to the incoming busses, for example, card 66b serving busses B1, B2, B9, B10, B17, B18, B25 and B26. Configuring the converter cards in this manner allows a single card type to function as any of the primary blocks when inserted in the appropriate location in the card file or as a spare block converter when inserted in the spare block file.

The serial to parallel to serial converters accept the serial information from the associated busses, convert it to parallel, and hold that converted data on their output busses such as 70 for reception by the high level multiplexer 67 at the appropriate time during its scan of the converters. Operating in the opposite direction, the converters 66 accept demultiplexed parallel information, convert it to serial and drive the return busses B1-B32 for distribution of the information via the low level multiplexers to the access ports. It should be noted that each bus B1-B32 is actually implemented as a pair of unidirectional busses, although for convenience each is illustrated herein as a single bidirectional bus. The high level multiplexer 67, as noted above, cyclically accepts the parallel information from the converters to provide parallel information to the information memories on 768 channel busses 72. Such information is written into the information memories in dedicated time slots. Under the control of connection memories, the information memories are read out for inserting such information on the return 768 channel busses to the high level multiplexer 67, where it is demultiplexed, transmitted to the converter cards 66, serialized for transmission back through the low level multiplexer, the D/A section of the code converters for distribution to the line, trunk, or register circuits as needed.

FIG. 3 is a block diagram which gives further detail of the relationship between the elements illustrated in FIG. 2 and the control therefor. FIG. 3 illustrates only a single serial to parallel to serial converter 66 and the two low level multiplexers 48 which it services. However, the high level multiplexer 67, although shown connected only to the single serial to parallel to serial converter 66 also has circuit connections (not shown) to the additional three converter cards in that block. FIG. 3 shows the high level multiplexer 67 feeding the signals toward the information memory 68 for storage therein, just as illustrated in FIG. 2. In this instance, however, demultiplexing is accomplished in a comparator and comparator interface 74. This element is utilized when the network is configured for three party conferencing, and accepts samples from two memory elements within the information memory, compares the information during each time slot and transmits the larger of the two samples. Strobe pulses to the serial to parallel to serial converter 66 cause the parallel registers therein to receive the result of the comparison in the appropriate time slot. In effect, the comparator and comparator interface 74 accomplishes the demultiplexing which complements the multiplexing performed in the element 67.

FIG. 3 also illustrates the control portions of a network block, including a pair of high level interfaces 75, 75' which receive data from the control complex 51 (FIG. 1) for distribution to selected network blocks. The control complex as well as the high level interfaces are described in greater detail in the aforementioned U.S. application Ser. No. 734,732 (now abandoned). In the distributed control complex arrangement taught therein the state microprocessor is the control element for the network. Also as taught therein, only one of the high level interfaces is active at a time, the second unit being provided for complete redundancy, such that a failure in an active interface causes the automatic actuation of its partner. To that end, both the input and output bus structure of the interfaces are connected in parallel. The state microprocessor communicates through the high level interface 75 or 75' to network interface cards identified as CPU A interface 76 and CPU B interface 77. The CPU A interface 76 is used both for maintenance and call processing and accomplishes partial decoding of addresses passed through the high level interface 75, 75'. The CPU B interface 77 receives data words from the control complex for writing connections in the network memories. More specifically, data is received which indicates the address of a particular location to be written, and further data is received which is the actual data to be written at that addressed location. Accordingly, the CPU B interface 77 has circuit connections for both address and data to the connection memory 79. As a result, connections can be written into the connection memory which cause the swap of information received by the information memory 68 between time slots associated with the connected channels.

The high level interface circuits are considered to be a part of the control complex and, in effect, provide the portion of the bus structure which interfaces the control complex with the network. As such, the active one of the high level interfaces 75, 75' services all of the network blocks. By way of contrast, the CPU interfaces 76, 77 are considered to be a part of the network block. Accordingly, five of each pair are provided in the maximum size system, a pair for each of the primary blocks and a pair for the spare. The high level interfaces 75, 75' are connected to all five sets. But, as will be described in greater detail below, each pair has a unique address which is decoded to allow only one of the network blocks to respond to an instruction from the control complex, such that the control complex has the ability to selectively address each block. In practicing the invention the spare network block, when enabled, responds to one of the primary addresses, such that the control complex, at least in the call processing mode, need only address the primary blocks. Accordingly, when the spare is put on line, the spare responds in the place of the block which it replaced, without the call processing programs knowing that to be the case. As a result, the call processing software is simplified since the software need not change, nor must a separate program be provided to cover the eventuality of using the spare in place of a primary. Once the spare is activated, and a failed primary disabled, call processing continues just as if the primary were on line, although the spare carries out the functions which are directed to the disabled primary.

With that in mind, attention will now be directed to the specific circuitry of the network elements where there is illustrated the details of one implementation of a network block according to the invention. As the description proceeds, among the things which will become apparent is the universality of each circuit card or circuit, such that each may serve as any of the primaries or as the spare, as well as the selectivity, whereby each of the universal cards is assigned a particular and unique function in a particular system configuration.

Turning now to FIGS. 4a-c, there is shown the converter means 66, interposed between the low level and high level multiplexers (see FIG. 3). The converter performs a serial to parallel conversion on data received from the low level multiplexer, holding it ready on output lines for reception by the high level multiplexer. In the opposite direction, the converter performs a parallel to serial conversion, accepting parallel data from the comparator and serializing it for reception by the low level multiplexer. Since each data word in the serial bit stream contains 8 bits, and since 8 converters feed a single high level multiplexer, the bit rate of both the low level and high level multiplexers remains the same, although the high level multiplexer handles eight times the amount of data. Accordingly, the bit rate of both the low level and high level multiplexers is about 6.176 mHz., allowing about 162 nanoseconds for each data bit and approximately 1300 nanoseconds for each 8 bit word.

FIG. 4a shows the serial to parallel portion of the converter circuit, and includes a set of four tri-state drivers 100-103, which are portions of the low end circuitry, segmented in FIG. 2 into blocks 0-3. The input busses, that is the cables which emanate from the line, trunk and service circuit frames are connected to the driver inputs, and particularly to one of the four groups which is associated with the particular network block in interest. Such connections are made to the connector at the back plane of the frame, such that when a board is inserted in the connector the appropriate drivers receive signals. Thus, the cables carrying the 96 serial channels would be wired to connectors such that in block 0, signals would be provided to the drivers 100, in block 1 to the drivers 101, in block 2 to the drivers 102 and in block 3 to the drivers 103. As noted in connection with the description of FIG. 2, the connectors of the spare network block cards are wired such that all of the drivers 100-103 would have input signals provided thereto.

In order to assure that only one of the blocks of drivers are active at any given time, means are provided for selectively enabling the blocks, shown herein as enabling means 105. The enabling means, in the present embodiment, is in the form of a one of four decoder which has four outputs, one of which is driven low depending upon the state of the input signals. The input signals are identified as NBID0FF* and NBID1FF*, the mnemonic indicating network block identification (0 or 1) flip-flop, the asterisk indicating that the low logic state is true. These input signals are hardwired in the case of the primary blocks and programmable in the case of the spare block, for the purpose of selecting and activating one of the four blocks of drivers, and thereby partially assigning an identity to the particular converter. For example, if both inverted ID bits are high, output 106 is driven low, such signal being provided to inverter 107, which drives its output high to enable the four tri-state drivers 110-113. The codes (non-inverted) for the primary channels are as follows:

| Block | ID1 | ID0 |
|-------|-----|-----|
| 0     | 0   | 0   |
| 1     | 0   | 1   |
| 2     | 1   | 0   |
| 3     | 1   | 1   |

Recalling that each card is capable of handling two 96 channel serial busses, the leads 115, 116 for the 100 block provide the input ports for such busses. In a practical implementation of the system, in addition to the 8 data bits per channel, there are also carried a signaling bit and a parity bit. The latter two bits are carried on a separate bus, in the illustrated embodiment the bus 117 carrying signaling and parity for the data on bus 115, and the bus 118 carrying signaling and parity for the data on bus 116. Each of the other driver blocks is similarly arranged. The bus 115, for example, receives from the low level multiplexer PCM data for Group X LMPCM*G(X), the bus 116 similar data for Group X + 1, while the busses 117, 118 receive LMSIG*G(X) and (X + 1).

The PCM data passed by the drivers 110, 111, as well as their counterparts in the other driver blocks, is presented to the input of associated 8 bit shift registers 120, 121 where it is clocked in under the control of an incoming data 162 nanosecond clock L162I* coupled to the register via inverter 122. When a full 8 bit word has been received, the output lines of the respective registers represent that 8 bit word in parallel, and that parallel data is strobed into latches 124, 125 under the control of an incoming data 1300 nanosecond clock L1300I* coupled to the latches via inverter 123. The latches 124, 125 accept the data under the control of the aforementioned clock and hold it on output lines 126, 127 in preparation for acceptance of that data by the high level multiplexer.

Referring now to the signaling and parity bits, each of those bits are sent twice during each 1300 nanosecond interval, such that they are clocked at a 324 nanosecond interval. Thus, the output of drivers 112, 113 are provided to respective shift registers 130, 131, and the received data is clocked in by a 324 nanosecond clock L324I*, provided to the registers by way of buffering inverter 132. That data, following reception is therefore available at the output lines, and is clocked into a buffering latch 134 at the same time and by the same clock which updated the latches 124, 125. Accordingly, during each 1300 nanosecond interval, a data word from each of the two serial busses is clocked into the registers 120, 121, while signaling and parity is clocked into the registers 130, 131. At the end of such 1300 nanosecond interval, the latches 124, 125, 134 are clocked to receive the data in parallel and to hold it for reception by the high level multiplexer at the appropriate point in the sequence. The high level multiplexer in turn receives the data from the latches 124, 125, 134 as well as similar latches on three additional cards, in timed sequence, thereby to form a continuous stream of 10 bit parallel words from each of the channels, each word occupying a time slot of 162 nanoseconds. It will be apparent that while this is taking place the registers 120, 121, 130, 131 are loading up a subsequent word, such that the cycle repeats continuously to continue funneling information from the low level circuit toward the switching elements of the network.

Before turning to the parallel to serial portion of the circuit, attention will first be directed to the circuitry which terminates the cables which implement the 96 channel serial busses. Recalling that each of these cables carries a serial bit stream with pulses only about 162 nanoseconds wide, and realizing that the cables are typically about 30 feet in length, the importance of achieving a proper termination will become apparent. And in order to satisfy the criteria of providing backup equipment for everything beyond the 96 channel serial level, it becomes necessary to terminate each cable at two locations, further complicating the terminating problem.

Several steps are taken to assure that the data which is sent by the originating frames is reliably received received at the network. Initially, the terminating impedances for the incoming cables are split between the primary and spare blocks, such that with the circuit boards for both blocks in place the cable is properly terminated, but with one block removed the impedance mismatch which is created is tolerable. To accomplish that, each of the input lines 115-118, and the corresponding lines in the driver blocks 101-103 have terminating impedances connected to ground which are twice the value of the cable characteristic impedance. For example, if 100 ohm cable is used as the serial input bus, the value of each of the terminating impedances 140-143 in the resistor pack 144 is 200 ohms. As a result, with both the primary and spare blocks in place, there are two of such terminating resistors in parallel, providing a termination of 100 ohms to match the characteristic impedance of the cable. But with one of the boards removed, such as for maintenance, there remains a 200 ohm terminating impedance, which although providing a 2 to 1 mismatch, still achieves a termination which can be tolerated, at least for a short period.

The second aspect of proper termination is illustrated schematically in FIG. 2 which shows the incoming cables connected to both the primary and spare blocks. Focusing on the cable 145 for bus B1, it is seen that the cable terminates in the equipment frame near the primary block 0 where there is formed a junction 146 from which emanate cables 147 going to the primary block and 148 to the spare. The cable 147 is looped as suggested by the break lines at 147a, such that the length from the junction to the back plane connector is equal to the corresponding length of cable 148. Accordingly, reflections which would otherwise be caused by unequal cable lengths are minimized.

Even with those steps taken, it has been found that the incoming data at the receiving drivers is valid only for about 50% of each period, that is, for about 80 nanoseconds of each 162 nanosecond interval. Considerable ringing, reflection and the like is found in the initial portion of each pulse which ultimately settles down until about the termination of the period when switching again occurs, causing additional noise. An additional problem is caused by unequal propagation delays in the circuit elements which can render the data unreliable near the beginning and end of each pulse. However, the data has been found to be stable for almost all conditions from about the 35% point of the pulse to about the 85% point. To take advantage of that fact, the clocks L162I* and L324I* are delayed in phase to occur about at the 50% point of each 162 nanosecond interval. Accordingly, even in the presence of substantial noise, data generated at the low level circuit is reliably received at the network.

Turning now to FIG. 4b, there is shown the parallel to serial portion of the converter circuit where parallel data switched through the network is converted to serial for return to the low level multiplexer, for ultimate distribution to the line, trunk and service circuits. As noted in general terms above, 8 bits of parallel data B0-B7, as well as signaling and parity B8, B9, are read out of the information memory and passed through the comparator to appear as CMPB0*-CMPB9* at the input of the parallel to serial converter. Resistor packs 150-152 provide the appropriate terminations. The data bits CMPB0*-CMPB7* are coupled to a pair of 8 bit latches 153, 154, one of such latches serving each of the 96 channel busses serviced by the particular converter circuit. When data for the associated bus, say that serviced by latch 153, appears on the lines, that data is strobed into the latch by way of a low level parallel to serial strobe pulse LPSSTR*(X) passed through an inverter 156 to the clock input of the latch 153. At the same time CMPB8* and CMPB9* are strobed into a latch 159. In like fashion, data is strobed into the pair of latches 154, 160 at the appropriate point in the sequence by a low level parallel to serial strobe pulse for that channel LPSSTR*(X + 1) coupled through an inverter 157 to the clock inputs. About 1300 nanoseconds are consumed in loading the two pair of latches just described and the 6 similar pair for the additional 6 channel busses served by a particular network block. The other network blocks are also executing the same function at the same time. At the end of 1300 nanoseconds, the process is ready to begin anew.

Before that commences, the data in the latches is strobed into a set of registers for serialization. The register associated with latch 153 is comprised of a pair of 4 bit registers 161, 162 having the $Q_D$ output of register 161 coupled to the J and $\overline{K}$ inputs of the register 162. Registers 163, 164 associated with the latch 154 are similarly arranged. The register 165 is associated with the latch 159 for receiving the signaling and parity bit for the first channel, whereas the register 166 serves the same function for the second channel. Since there are only two bits clocked out of the registers 165, 166 and each is sent twice, the A and B inputs are tied in parallel as are the C and D inputs. The data from the respective latches is loaded into the associated registers, as is the data on the other converter cards in the block, under the control of a low level load data outgoing pulse LLD0, shaped by inverter 168. The data is then clocked out of the registers, in the case of the 0 through 7 bits at a 162 nanosecond interval under control of a low level 162 outgoing pulse L1620* shaped by inverter 169. Similarly, the signaling and parity bits are clocked out at a 324 nanosecond rate by a low level 324 outgoing pulse L3240* buffered by inverter 170. Referring to the registers 161, 162, the serial data appears on the output line 172 which is connected in parallel to 4 tri-state drivers in respective driver blocks 100a-103a (FIG. 4c). Such blocks are associated with the input blocks 100-103 described in connection with the serial to parallel conversion, and form the output portion of the low level end of the serial to parallel to serial converter. The serial data from the first 8 bit word is connected to a driver 174 in the block 100a, as well as to similar drivers in the other 3 blocks. The serial data from the registers 163, 164 is connected to a driver 175, as well as to similar drivers in the other blocks. The drivers 176, 177 as well as their partners in the other 3 blocks receive the 324 nanosecond signaling and parity information from the registers 165, 166 respectively. The mnemomics on the drawing indicate the identity of the data passed through the respective drivers. For example, the driver 174 passes parallel to serial PCM data for Group X PSPCM*G(X). The corresponding driver in Group 102a, that is the driver for block 2 passes PSPCM*G(X + 16) that is, the similar group but for network block 2.

Which of the drivers are active to pass the signal is controlled in dependence on the identity of the network block in question and the state of NBDIS signal. Ignoring the latter for the moment, the identity, just as in the case of decoder 105, is either fixed or programmable depending upon whether the particular card is functioning as a primary or spare block. Accordingly, a decoder 180 is provided which receives the identity codes NBID0FF* and NBID1FF* as inputs to provide a 1 of 4 output which addresses one of the four blocks 100a-103a. As described in connection with the decoder 105, if the circuit is to function as block 0, the inverted 0-0 will be provided at the inputs, that is both ID bits will be high, causing the output 181 to go low which signal, when coupled through the buffers 182, 183 enables the tri-state drivers 174, 177. All of the other tri-state drivers on that circuit card will be disabled. Accordingly, the parallel data which is received from the comparator will be serialized and passed through the appropriate ones of the drivers 174-177 for return to the cables serviced by block 0. The response of the circuit to other identification codes will now be apparent.

With the circuit configured to have one spare network block in place at all times, means are provided for continuously maintaining one of the network blocks disabled, so that only a full complement can be active at any given time. To that end a network block disable function NBDIS is provided, and is coupled to a disabling input 185 of the decoder 180. When that input is driven high, the decoder 180 is disabled and all outputs will be high, thereby preventing any of the drivers in the blocks 100a–103a from passing any signals. It is noteworthy that a similar function is not associated with the decoder 105. Accordingly, even when a block is disabled, signals generated at the lines, trunks and the like are passed through the serial input drivers 100–103, switched through the network, returned as parallel data and processed through the registers 161 etc. Parity and other operational checks can be performed as normal. But if the block is disabled, the decoder 180 serves to disable all of the output drivers, thereby preventing that block from affecting the cables which are returning data to the low level circuit for distribution to the lines, trunks and the like. Accordingly, the network remains active for the purpose of testing by the maintenance software, while avoiding any possibility of the network block under test affecting the lines to which it is connected.

As shown in FIG. 3, control signals for the network are produced by the state microprocessor and coupled to interface circuits in the network via the active one of high level interfaces 75, 75'. Since the high level interface circuit was described in detail in the aforementioned Pitroda application, only an abbreviated description will be given here, and the disclosure found in said application is incorporated herein by reference.

As described in the aforementioned Pitroda application the control complex is completely duplicated, including redundant microprocessors, and a redundant bus structure. As a result, the high level interface, the block diagram of which is illustrated in FIG. 5, includes a number of 2 to 1 multiplexers, which control data flow to and from the active one of the redundant microprocessors. A first 2 to 1 multiplexer 201 serves as an address selector, having as inputs address bits A0-A15 and address parity AP from copy 0, as well as the corresponding bits from copy 1. A data select multiplexer 203 has as inputs the D0-D7 and data parity DP bits from both copies 0 and 1. A control selector 205 has write and read control signals from copy 0 and copy 1, as well as a frame enable FE signal 206 produced in the high level interface in response to receipt of its characteristic address. The copy 0 and copy 1 active signals are provided to a copy select circuit 207 to produce a control signal for the 2 to 1 multiplexers as well as for other circuitry as indicated in the block diagram. Such signals serve to select one of the two groups of input signals in dependence upon which microprocessor copy is active at the time.

An address parity checker 213 and a data parity checker 215 are provided to examine each received word for the purpose of detecting parity errors. In the event a parity error is detected, an address parity error APE or data parity error DPE signal, as the case may be, is generated which sets a latch in the status word latches 230, and also causes the all seems well encoder 211 to produce a pulse on the all seems well ASW line for the active copy.

The address bits received from the active copy of the microprocessor are partly decoded in the high level interface and partly passed to lower order circuitry for decoding there. The high order bits A8-A15 are coupled to a high level interface address decoder 225 where they are decoded to produce a frame enable signal 206. The high order bits, that is address bits A12-A15 must assume a fixed pattern reserved for addressing high level interfaces, whereas the address bits A8-A11 must match back plane strapped bits for a particular high level interface board effected by means of strapping ST8-ST11. When all conditions are satisfied the frame enable signal is generated on the line 206, and coupled back to the control selector 205 which then is allowed to pass control signals from the active CPU. The mid order address bits A5-A7 are coupled to a 1 of 8 low level interface enable decoder 227 which produces file enable signals FLE0-FLE7 which actuate respective blocks of low level equipment. A 1 of 8 error detector 229 is provided to assure that only one of the file enable signals is active at any given time. If more than one file enable signal is active, a 1 of 8 error is produced which is coupled back to the status word latches 230 to set an appropriate latch therein. The low order bits A0-A4 are passed through a pair of inverters 226, 228 to be passed to the low order circuitry for decoding there. In addition a low level interface address parity generator 235 sends an appropriate parity bit with each low order address word. The address bits LA0-4, as inverted by inverter 226 are also coupled to a maintenance access decode circuit 231 where they are decoded to provide a maintenance access signal MAC, and also to a status word write circuit 232 which controls writing of the status word latches in the maintenance mode. In summary, it is seen that when an appropriate address appears at the high level interface circuit, it activates that circuit, it causes 1 of 8 file enable signals to be generated, and it passes 5 bits of address data as well as the file enable signals to the lower order circuitry for addressing particular circuits therein.

Having considered addressing in the high level interface, attention will now be directed to the circuitry associated with data words. Data bits D0-D7 from the active copy, as passed through the data select multiplexer 203 are coupled to a read/write low level interface data gate 218. The control signals for that gate allow the data bits to be passed when maintenance is not accessing the high level interface $\overline{MAC}$, when the trouble latch is not set TRBL, and when the read pulse is active. At that time, the data bits D0-D7 and DP are passed through the gate 218 where they appear as low level data LD0-LD7 and LDP to the low order circuitry, in this case the CPU interface B (FIG. 3). A low level interface control gate 219 is also provided to pass read R, write WR and high level active HLA signals from the high level interface to the low order circuits. As will be described in greater detail below, the data is accepted and handled in accordance with the file enable, low order address and control bits passed thereto.

A further path for data flow is from the low level circuits, that is, the CPU A and B interfaces, to the CPU by way of the high level interface. To that end, data bits LD0-LD7 received from the low order circuitry are coupled to a tri-state data bus 240 for passage back to the active copy of the microprocessor. The tri-state data bus 240 is enabled by a data/status word select circuit 243, which enables the tri-state data bus when the system is not in the maintenance mode $\overline{MAC}$ and when a read pulse R is present. At that time, the data bits pass through the tri-state bus to form input data DIN0-DIN7 which is coupled to a data driver 221. The data driver 221 also has coupled thereto an input signal from a data driver control circuit 217, which in turn receives the copy 0 and copy 1 active signals. Accordingly, appropriate gates in the data driver circuit 221 are enabled to allow the data bits to pass to the D0-D7 lines of the active copy of the microprocessor. In this way, the low order circuits can communicate back to the microprocessor.

Further paths for data flow exists from the high level interface itself back to the microprocessor. In this case, data within the status word latches 230 is read to the microprocessor. To accomplish that, the data/status word select circuit 243 switches its output lead in response to the maintenance active signal MAC going active. The tri-state data bus 240 is disabled, and the status word select circuit 222 is enabled. The status word select circuit selects one of two words for transmission back to the CPU, in dependence on the state of address bit A2. When the write pulse from the active copy is present, the word selected by the A2 is read from the status word latches 230 and coupled via the status word select circuit 222 to the data drivers 221 for transmission to the active copy as described above.

Finally, it is possible for the CPU to write data into the high level interface, this being accomplished by the data bits D0-D7 being coupled directly to the status word data latches 230, in combination with a write pulse coupled through the control select circuit 205.

In summary, the active microprocessor has full read/write control not only over the high level interface but also over the low level circuits connected to that interface. Call processing is concerned mainly with the ability to write data from the CPU into the low order circuits. However, all of the four forms of data flow are useful in maintenance, where the CPU may exercise a particular function to determine its operability.

With that in mind, attention will now be directed to FIGS. 6a-b which show a circuit diagram for the CPU A interface 76. The address bits generated by the high level interface as described above enter the CPU A interface 76 at the inputs illustrated at the left of FIG. 6a. Recalling that there are redundant high level interfaces associated with the network, the address bits from both copies are available, including low order address bits LA0-LA4 as well as parity LAP, copies 0 and 1, all of which signals serve as inputs for a 2 to 1 multiplex address selector 301. Only two of the file enable signals generated by the high level interface are required in the network, signals FLE4* and FLE5* for copies 0 and 1 being provided as inputs to a 2 to 1 multiplexer 302. The control inputs for the respective copies are also selected by the multiplexer 302 the write pulse LWR* and read pulse LRPL* for each copy being provided as inputs thereto. Which of the inputs is passed to the output is determined by the state of HLA*/1, inverted by inverter 303, the output of which is coupled to the selector inputs of the multiplexers 301, 302. The high level active signal for copy 0 HLA*/0 is also inverted, in this case by inverter 304, and coupled together with the output of inverter 303 to the inputs of an exclusive OR gate 305, the output of which indicates, in the normal state that only one high level interface is active. In the event both high level interface signals appear active, the output of exclusive OR gate 305 is switched low to prevent the CPU A interface from responding.

Attention will first be directed to the parity checking scheme which serves as means for detecting faults in the respective network blocks. The low order address bits LA0-4 and parity LAP are coupled as inputs to a parity checker 308, the output of which is coupled to the D input of an address parity error latch 309. The clock input of the latch is controlled by a NOR gate 310 whose output is gated through a further AND gate 311, such that a clock signal is generated if the flip-flop 309 is in the reset state for any of the network block maintenance read NBMNTRD, network block maintenance write NBMNTWR or network block call processing write NBCPWR control functions. With the concurrence of the appropriate conditions the flip-flop 309 is set to generate an address parity error signal APEFF.

A data parity error flip-flop 314 is also provided, to produce a DPEFF signal indicative of the detection of a parity error in data from the high level interface. The data is actually coupled to the CPU B interface 77 as will be described below, which generates a CPU B data parity error signal CPUBDPE coupled to the D input of the flip-flop 314. Such flip-flop is clocked similarly to flip-flop 309, except that it does not respond to the function NBMNTRD. A further pair of latches 316, 319 are provided to indicate parity errors from the connection memories 1 and 2, producing as output signals CM0PEFF and CM1PEFF. Parity is checked on each word read out of the connection memory, such words being used to address the information memory for readout of the stored PCM data. The flip-flop stages 316, 319 are two stage in nature. For example, stage 316 has a first flip-flop 317 which clocks the connection memory 0 parity error signal CM0PE into the flip-flop under the control of the connection memory parity error clock CMPECLK*, and a second stage which clocks the output of flip-flop 317 into the flip-flop 318 under the control of a network block maintenance access signal NBMNTACC. The stage 319 is similarly arranged.

Returning to the incoming address signals, it is seen that the least significant three bits LA0-LA2 are decoded by circuitry generally indicated at 320 for use in the CPU A interface, and are also buffered by inverters 321 to form CPU A interface address signals CPUAA0*-CPUAA2* for use in the CPU B interface. The two most significant low order address bits LA3, LA4 are connected as inputs to a pair of comparators 323, 324 to selectively address the respective blocks in the network, while the FLE5 signal, also coupled to the comparator, is used for further addressing capability and also to distinguish between maintenance and call processing functions.

Referring specifically to the comparators, as a generality, it can be said that the comparator 323 responds to maintenance instructions whereas the comparator 324 responds to call processing instructions, although under certain circumstances, maintenance also has access to comparator 324. The enable inputs of both comparators are driven by the output of an exclusive OR gate 325 whose inputs are FLE4 and FLE5. Accordingly one but not both of signals FLE4 and FLE5 must be high in order to allow the processor access to the network. As a second common requirement, the output of exclusive OR gate 305 is compared against 1 in both comparators. The gate inputs are HLA0 and HLA1. Accordingly, one but not both of the high level interfaces must be active in order to allow the processor access to the network.

Turning specifically to the maintenance comparator 323, it is seen that three input signals are provided thereto, identified as NBID0-NBID2, for comparison against LA3, LA4 and FLE5 respectively. The NBID0-2 functions are hardwired in the back plane of each of the network blocks to assign a maintenance address thereto. In the case of primary blocks, NBID0 and 1 carry the ID codes set forth in the previous table while NBID2 is 0 in all cases. In the case of the spare block, NBID2 is strapped high while NBID1 and 0 are both low. Those three address levels are compared against LA3, LA4 and FLE5. In other words, for maintenance access the most significant two bits of the low order address signal carry the identification code of the particular block (or 0-0 for the spare), while FLE5 must be low to address primary blocks or high for the spare. Thus, when one of the high level interfaces presents those three bits to the CPU interface, and if FLE4 and 5 are of opposite states, the comparator 323 will be satisfied, and will produce an output allowing maintenance to read or write the maintenance ports in the block.

Just as in the case of comparator 323, comparator 324 receives the LA3, LA4 and FLE5 signals from the high level interface. It compares LA3 and LA4 against PNBID0 and PNBID1, respectively. The latter two bits are hardwired for primaries with the identity assigned to the block, and are programmable for the spare such that it can assume the identity of any of the primaries. The FLE5 signal is compared against PNBID2 which is generated on the CPU A interface itself. The PNBID2 bit is programmed by maintenance to a 0 for any block that is considered to be on line insofar as control is concerned or to a 1 for the off line block. The common control then configures all normal call processing instructions with the FLE5 bit low (and FLE4 high) such that the comparator 324 will be satisfied. This is the normal situation where the common control accesses a network block to write a connection therein. But, as will become more apparent, it is also desirable for maintenance to write connections, and that capability is not provided through the maintenance ports. Accordingly, maintenance is provided the ability to set the PNBID2 bit on the CPU A interface card to a 1, and then to generate a call processing instruction with FLE5 high such that the comparator 324 will be satisfied. The significance of that ability will become more apparent after a consideration of the CPU B interface.

When the common control desires to access a particular network block in the maintenance mode, it outputs the appropriate address which satisfies the comparator 323 in that block which then produces an output signal used in decoding circuitry 326 to accomplish the desired maintenance function. For example, a NAND gate 327 gates the maintenance access code with the low level read pulse LRPL to produce a network block maintenance read function NBMNTRD. A NAND gate 328 gates the maintenance access signal with CPUAA2 and the low order write pulse LWR to produce a network block maintenance write function NBMNTWR.

The output of the call processing comparator 324 is decoded in gating circuitry along with the write function to produce the desired call processing control signals. A NAND gate 330 gates the call processing access signal produced by the comparator 324 with the CPUAA2* signal at the output of inverter 331, and with the low level write signal LWR to produce a network block call processing write signal NBCPWR. Further signals are produced which affect all of the network blocks simultaneously, not being gated with the particular addresses decoded by the comparator 324. Such signals are the low level clock write LLCWR* at the output of inverter 333 and the low level clock read LLCRPL* at the output of inverter 334 which are made active by a write pulse or a read pulse respectively passed through the high level interface circuit.

Referring again to the gating circuitry 320 which decodes the CPUAA0-CPUAA2 signals, an AND gate 340 is provided which decodes CPUAA0* at the output of inverter 341, CPUAA1* at the output of inverter 342, and the network block maintenance write signal NBMNTWR decoded by AND gate 328 and passed to the gate 340 via inverter 343. Accordingly, the output of gate 340 is active when the CPU addresses the network high level interface, and particularly one block therein in the maintenance mode and with the low order address LA0 and LA1 bits in the appropriate configuration. The output of AND gate 340 partially enables a NAND gate 345 (FIG. 6b) to pass CPU data bit 3 CPUD3 buffered by gate 346 to produce a comparator interface parity error clear signal CIPECLR*.

The output of AND gate 340 also partially enables a pair of AND gates 348, 349, which receive as inputs CPUDB0 and CPUDB1, respectively. The outputs of those gates control a trouble flip-flop 351. Accordingly, when AND gate 340 is satisfied the CPU data bit 0 has set control over the trouble flip-flop 351 whereas CPU data bit 1 has reset control. When the flip-flop is set the Q output thereof goes high which acts through a pair of inverters 352, 353 to produce an active network block trouble flip-flop signal NBTBLFF. In addition, the high Q signal is passed through NOR gate 355 and an inverter 356 to produce a high network block disable function NBDIS. This, it will be recalled, is the signal which is coupled to the serial to parallel to serial interface card to disable the tri-state drivers which apply data on the return busses to the low level multiplexer. Accordingly, setting the trouble flip-flop 351 serves to disable the network block in question insofar as returning data to the low level multiplexer is concerned. Resetting the latch puts the block in question back on line. The high $\overline{Q}$ signal is also passed through an inverter 357 to produce a high information memory multiplex select signal IMMUXSL which is used in the information memory circuitry of the network to control data flow.

Returning again to the decoding circuitry 320, there is provided a further AND gate 360 which is satisfied when both CPUAA0 and AA1 are high in the presence of a network block maintenance write function NBMNTWR coupled thereto via inverter 343. The output of AND gate 360 partly enables a plurality of AND gates 362-367 to allow the processor to write into latches 370-372 when addressed thusly. Only the latch 370 need be written in primary blocks, whereas all of the latches are written in the spare block. The actual circuit elements are configured much as those described in connection with latch 351 and their arrangement will therefore not be described in detail. CPU data bit 0* is used to write the latch 372, the low state serving to set the latch and the high state serving to reset the latch. When set, the Q output of the latch 372 produces a high network block ID 0 flip-flop signal NBID0FF and a corresponding low NBID0FF*. Resetting the latch produces the opposite condition. The CPUBD1* signal similarly controls the latch 371 to produce a high NBID1FF when set. Finally, CPU data bit 2 CPUDB2* controls writing of the latch 370 to produce a high PNBID2 signal when set. It will now be apparent that the CPU controls the latches 370–372 for the purpose of producing latch address signals which assign an identity to the spare block, and also to control the condition of PNBID2 for all blocks.

Assignment of block identities is accomplished in the following manner. For the primary blocks, PNBID0 and 1 which are inputs to both the serial to parallel to serial converter (FIG. 4) and the CPU A interface (FIG. 6) are hardwired in the back plane. For the spare block the states of those inputs are controlled by the latches 372, 371 which are programmable. In the case of all blocks, both primary and spare, PNBID2 is programmable by way of latch 370. The control can program the ID2 bit of any block to control the response thereof to call processing write instructions. The bit can be programmed to cause a block to respond to maintenance call processing write instructions while ignoring ordinary call processing write instructions or vice versa. Finally, the trouble latch 351 can be programmed for all blocks, both primary and spare, to control the response of the network insofar as information flow therethrough is concerned. When the latch for a particular block is set, the high NBDIS signal produced by latch 351 controls the serial to parallel to serial converter (FIG. 4) as described above to simply disable the block outputs so that, insofar as the PCM information flow is concerned, it is off line.

Such an arrangement provides considerable flexibility. With regard to PCM information flow through the network, the network configuration is controlled by the respective trouble latches. Those latches are programmed so that one block is always off-line, maintaining a full complement of blocks on line at all times. Access to the respective network blocks by the control is not constrained by the trouble latch. The control can selectively access any of the blocks in the maintenance mode by virtue of their hardwired addresses and comparator 323. The control by appropriate manipulations of the PNBID2 bit, can write connections to an on-line block, to an off line block, or to both such blocks in parallel. And those connections can be written either in the maintenance mode or in the ordinary call processing mode.

As an example, if maintenance sets the latch 370 for a particular block to provide a high PNBID2 signal, and recalling that FLE5 is always low for ordinary call processing write cycles, that block cannot respond to such instructions. Thus, if maintenance assigns the spare block the identity of a primary and desires to write connections into the spare but not into the primary, it can simply set PNBID2 high for the primary and low for the spare so that the primary does not respond to the call processing write instructions. And that can be done even when the primary is actively functioning in maintaining connections. When it is desired to cause the primary to again respond to call processing write cycles, PNBID2 is returned low by maintenance so that the comparator 324 may again respond. Alternatively, maintenance can set PNBID2 high for the spare and low for the primary, and use maintenance call processing instructions to write connections in the spare but not in the primary. Realizing that the control simply addresses the network during call processing as a field of memory, it will be appreciated that maintenance can configure the network so that when the field is addressed, either the primary, the spare or both blocks respond. Thus even though call processing is addressing a physically different piece of hardware after a block switch, instruction changes are not required.

In the exemplary embodiment of the invention, programming of the block identities can be accomplished both automatically by the common control or manually by a craftsperson. As described above, in the maintenance mode the control complex has the ability to write the latches 351, 370–372 for the purpose of interchanging the spare and any of the primary blocks. The ability to accomplish that manually is provided by way of a maintenance panel associated with the network frame. That panel provides means for controlling the identification and trouble flip-flops, simplistically shown in FIG. 6b as an array of pushbutton switches 380–387. Those switches provide inputs to associated negative logic NAND gates 388–395, which in turn set or reset associated ones of the latches 351, 370–372. An inhibit signal for the NAND gates 388–395 is provided by the output of maintenance decoder 323 to prevent manual switching when the particular CPU A interface is being accessed in the maintenance mode. However, at any other time, all of the aforementioned NAND gates are partly enabled such that depression of any of the switches 380–387 will cause the associated latch to respond. For example, depression of the switch 380 causes the production of a maintenance panel network block identification bit 2 set function MPNBID2S* which is coupled to the latch 370, causing the Q output thereof to switch high. The switch 381 serves to reset the flip-flop. Similarly, switches 382 and 383 set and reset the ID 1 flip-flop 371 while the switches 384, 385 set and reset respectively the ID 0 flip-flop 372. Finally, the switches 386, 387 set and reset respectively the trouble flip-flop 351. Accordingly, it will be appreciated that a craftsperson has the full ability to assign any identity to the spare network block, to interchange the spare with any of the primary blocks, and to selectively switch the blocks on or off line, both with respect to control and switching of PCM information.

Figure 7C:
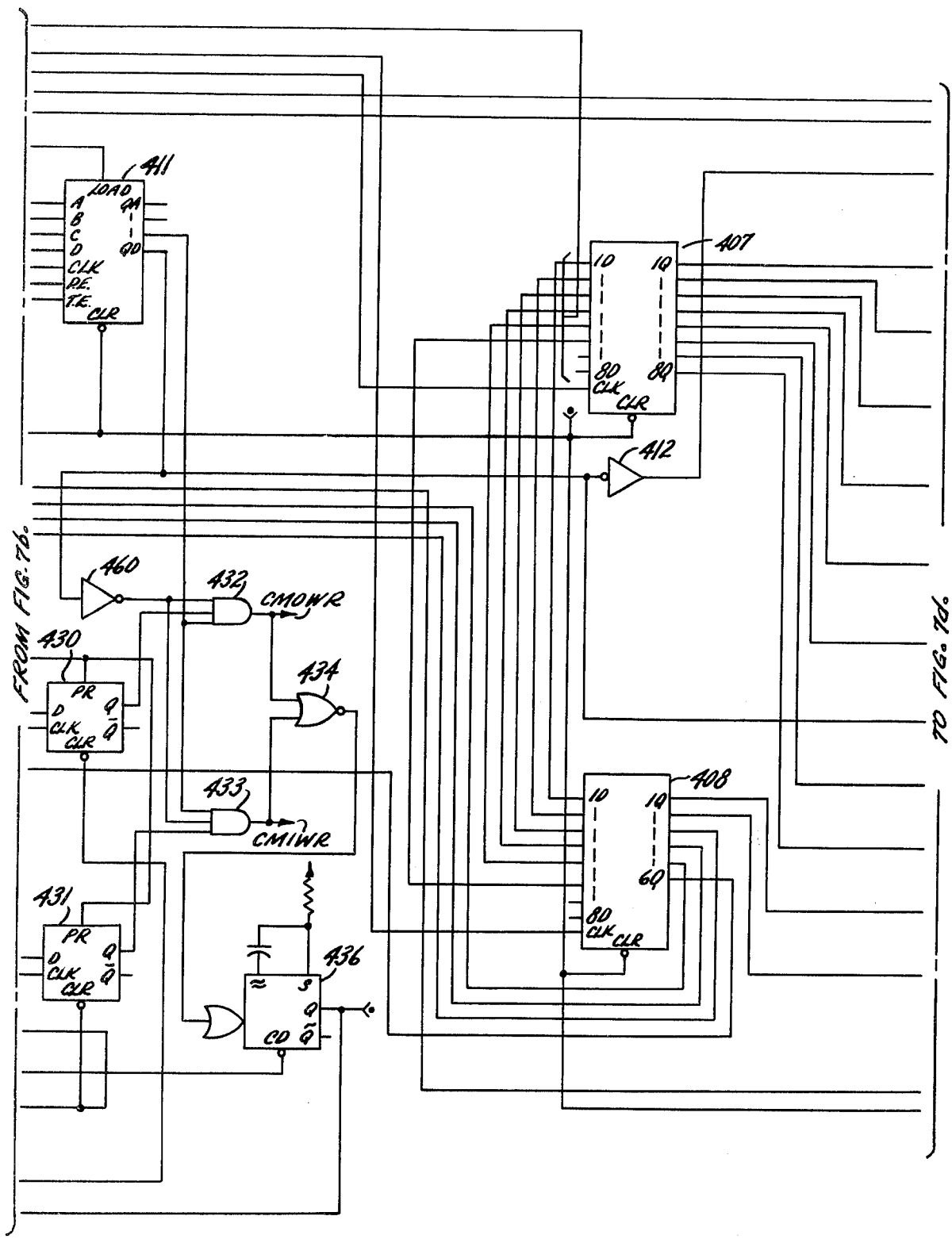

Turning now to FIGS. 7a–e, there is illustrated the circuitry of the CPU B interface 77. As noted above, the CPU B interface is active in both the maintenance and call processing modes. The data bus coupling the CPU B interface to the high level interface is illustrated at 400 (FIG. 7a), and includes low order data bits and parity LD0–LD7, LDP for both the copy 0 and copy 1 high level interfaces. Those signals are coupled to a 2 to 1 multiplexer 401 having its selector input driven by the HLA*/1 signal coupled thereto via inverter 402. Accordingly, data bits D0–D7 and parity DP from the active high level interface appear at the outputs of the multiplexer 401. Parity is checked by parity checker 404 which produces a CPUBDPE parity error signal in response to detection of an error. Data bits D0–D6 are connected as inputs to a low order data register 405 and to a high order data register 406 (FIG. 7b). Similarly, data bits D0–D7 are coupled to a low order address register 407 and data bits D0–D5 are coupled to a high order address register 408 (FIG. 7c). Accordingly, when a particular network block is addressed, the control complex has the ability to selectively load data into each of the four aforementioned registers. The manner in which that is accomplished will be described below. Suffice it to say for the moment that data is loaded into the low and high order data registers indicating the network slot number of a connection to be made, and further data is loaded into the high and low order address registers indicating the connection memory address where the connection is to be written.

Turning first to the address registers 407, 408, it is seen that the outputs thereof are passed through an array of tri-state drivers 410 (FIG. 7d) when those drivers are activated by the $Q_D$ output of a for bit counter 411, which signal is passed through inverter 412 to the enabling inputs of the drivers. That data is then available to be parallel loaded into a counter 414. The counter outputs in turn are buffered by inverting drivers 415 to provide connection memory address signals CMA0*-CMA9*, a connection memory data latch signal CMDL* and, via double inverters 416, 417 to provide a connection memory parity error clock signal CMPECLK*.

In a similar fashion, the outputs of the low order and high order data registers 405, 406 are coupled through inverting drivers 420 to produce connection memory data signals CMD0*-CMD5*, CMD7*-CMD12*, and low order and high order parity bits CMDPLO* and CMDPHI*. Drivers within the array 420 also receive the data bits D0-D3 directly to produce CPU data bits CPUBD0*-CPUBD3* which are used in the functioning of the CPU A interface as described above. Among the functions of those bits, it is recalled, is the setting and resetting of the identification and trouble latches 370-372, 351.

Before turning to the operation of the circuitry described thus far, attention will first be directed to a pair of decoders 425, 426 (FIG. 7b) which are also instrumental in the operation of writing connections in the connection memories. When the high and low order address and data registers are full, the comparators respond to particular bits in the high order address register for the purpose of generating write signals for connection memory 0 or connection memory 1. It should be noted in this case that the connection memories are not redundant, but are the paired connection memories provided when the network is configured for three port conferencing. Accordingly, in setting up a three part conference, it is necessary to write at the party 1 locations in connection memories 0 and 1 the network slot numbers of parties 2 and 3 respectively. Similar connections are written for each of the three parties.

Referring to the comparators 425, 426, it is seen that the enable input is driven by the output of a buffer full latch 428 which, as will become more apparent, produces a high buffer full signal when the four buffer registers are loaded with data for a connection to be written. When enabled, both comparators 425, 426 compare the 3Q, 4Q and 6Q outputs of the high order address register 408 against PNBID0, PNBID1 and PNBID2 respectively. Thus, the third and fourth bits of the high order address register are compared against the network block identity code, hardwired in the case of primary blocks and programmed in the case of the spare block. The sixth bit is compared against the programmed PNBID2 function which, recalling the constraints imposed by comparators 323, 324 on the CPU A interface, must be a 0 for normal call processing write cycles and a 1 for maintenance call processing write cycles. Finally, the fifth bit of the high order address register is compared to 0 in comparator 425 and to 1 in comparator 426. This fifth bit is programmed to select connection memory 0 or 1, such that when it is 0 the comparator 425 will be satisfied whereas when it is 1 the comparator 426 will be satisfied. The outputs of the comparators 425, 426 are coupled to D inputs of respective latches 430, 431 whose outputs are gated at 432, 433 to form respective connection memory write signals CM0WR and CM1WR. In addition, the outputs of those gates are provided to a NOR gate 434 whose output clocks a monostable multivibrator 436 which produces a clear CLR signal used to reset portions of the write circuitry.

The structure and function of the remainder of the circuit elements will become clear from a description of an operating cycle. But first is should be noted that the CPU B interface functions to address the connection memories not only for writing new connections as described above, but also during normal cycling of the network where locations in the connection memories are sequentially addressed for the purpose of reading out connections previously written in order to use that information to address the information memories. It should also be recalled that each network block has 772 time slots, 768 dedicated to active channels and 4 lost to framing. In the exemplary embodiment, it is during the four framing time slots, when active channels are not being addressed, that the connection memory is available to receive new connection information from the common control. Finally, it will become apparent that the counters 414 are used both for sequentially addressing connection memory locations for call processing, and also for addressing particular locations during the framing of reset interval to write new connections.

With that in mind, it is seen that the counter 414 is configured as a modulo 4096 counter. The counter is clocked by 41 nanosecond clock signals produced by the low level clock, and has its cycle terminated during the reset interval by further signals originating from the low level clock. The reset pulse is 648 nanoseconds wide and has a period of 125 microseconds.

Assuming that we are at the initiation of a reset interval, and that no connection data is loaded into the registers for writing into connection memories, the reset signal CMRST is inverted by inverter 440 so that it appears at the D input of a flip-flop 441. That signal is clocked into the flip-flop 80 nanoseconds later under the control of a low level connection memory 81 nanosecond clock LCM81*, inverted by inverter 442. Accordingly, the Q output of the flip-flop 441 is driven low, and that low output appears at the D input of a second flip-flop 444. That low is clocked into the flip-flop 444 41 nanoseconds later, by LCM41* inverted by inverter 445. The low Q output of flip-flop 444 is applied to the load inputs of the counters 414. As will become more apparent, during the second half of each 648 nanosecond reset pulses CMRST, the tri-state drivers 410 are disabled. In that condition, all of the counter inputs are high by virtue of the pull-up resistors connected thereto. Accordingly, the next 41 nanosecond clock pulse LCM41, applied to the clock inputs of the counters 414, clocks all 1's into that counter. At the termination of the reset pulse, that is when CMRST returns low, that signal is clocked through the flip-flops 441, 444 as before to remove the load signal from the counters 414. Since the counter status is standing at all 1's, the next 41 nanosecond clock pulse advances the counter to count 0, thereby addressing the first location in connection memory via the address lines CMA0*-CMA9*. Recalling that each time slot is 162 nanoseconds wide, and realizing that the counter 414 is clocked at a 41 nanosecond rate, it is seen that the connection memory address, the least significant bit of which is taken from the third stage of the counter, is changed at a 162 nanosecond period. The second bit of the counter 414 is inverted to produce a CMDL* signal such that at the 81 nanosecond point of each 162 nanosecond interval CMDL* provides a positive to negative transition. The function of that signal is to latch data read from the addressed connection memory location, whereupon that latched data is used to address the information memory for reading a sample from the connected party. At the end of the 162 nanosecond period, the second bit of the counter 414 is again switched, which acts through inverters 416, 417 to cause a positive to negative transition of connection memory parity error clock signal CMPECLK* which serves to latch the parity error status from the connection memory cards. At that point, the connection memory address is also incremented by 1. At the end of count 767, the delayed reset pulse again loads all 1's in the counter as described previously. At that point all 768 locations of the connection memory have been read out and the cycle is ready to begin anew.

Before describing the corresponding cycle in the case where a new connection is to be written, attention will first be directed to the manner in which the data and address registers are loaded prior to the connection memory write cycle. It is noted in passing that this loading operation can take place while the counter 414 is active in its sequential addressing of the connection memory.

Loading of the address and data registers is under the control of decoding circuitry generally indicated at 450. The CPU A address bits CPUAA0*, CPUAA1*, described in connection with FIG. 6 are decoded and gated with network block call processing write NBCPWR for the purpose of loading the four registers in question. For the first write operation, both CPUAA0* and CPUAA1* are high such that when NBCPWR swings high AND gate 451 is satisfied to clock data bits D0-D5 into the high order address register 408. For the second write operation CPUAA0* is brought low while CPUAA1* remains high such that in the presence of NBCPWR, AND gate 452 is satisfied thereby clocking data bits D0-D7 into the low order address register 407. Accordingly, the low order address register now contains connection memory address bits 0-9, two bits corresponding to ID 0 and ID 1, a bit selecting connection memory 0 or connection memory 1 for writing, and a PNIB2 bit which distinguishes call processing from maintenance call processing write cycles.

For the third portion of the load cycle, CPUAA0* is high while CPUAA1* is low, such that in the presence of NBCPWR, AND gate 453 is satisfied. The output of that gate is connected to the clock input of the high order data register, thereby clocking bits D0-D6 into that register. Finally, for the fourth portion of the write cycle, both CPUAA0* and CPUAA1* are high such that in the presence of NBCPWR, AND gate 454 is satisfied to clock data bits D0-D6 into the low order data register 405. The data register now contains two bytes, each with parity, of data indicating the connection to be written into the connection memory. Data bit D7 is always high for the last write cycle and is applied to the D input of buffer full latch 428 which also has its clock input driven by AND gate 454. Accordingly, during the fourth phase of the load cycle the buffer full register 428 is clocked to drive its Q output high producing a high buffer full BFL signal. That signal enables the comparators 425, 426 such that one or the other of the comparators produces a high signal in dependence on the state of the high order address bit register. Which of the comparators is enabled is dependent upon which of the connection memories is to be written. The output signal is held at the corresponding D input of the flip-flop 430 or 431 in preparation for the reset interval now to be described.

Just as in the case described previously, 121 nanoseconds after the rise of CMRST, the low signal from flip-flop 441 is clocked into the flip-flop 444, driving its Q output low and $\overline{Q}$ high. The rising edge of the $\overline{Q}$ output clocks the flip-flops 430, 431, such that the high signal present at the input of one, say flip-flop 430, drives the Q output thereof high. At the same time, the high $\overline{Q}$ output removes the load which had previously been applied to four bit counter 411, thereby readying that counter, which stands with its outputs at all 1, for further operation. On the next transition of LCM41, 41 nanoseconds later, the counter 411 is clocked to the all 0 state. The low $Q_D$, inverted by inverter 412 is applied to the enabling inputs of the tri-state drivers 410. Since the load input of counter 414 had been switched low at the time flip-flop 444 changed state, on the next 41 nanosecond clock pulse, which is applied to the clock inputs of the counters 414, data from the low order and high order address bit registers is passed through the tri-state drivers and clocked into the counter 414. As a result, the counter 414 now carries the address previously loaded into the registers 407, 408 and the outputs of the drivers 415 address that location in the connection memory. The clock pulse which loaded the counter 414 also advanced the counter 411 to count 1. Subsequent clock pulses do not change the state of the counter 414 because the $Q_D$ output of counter 411 maintains the tri-state drivers active, thereby continuing to apply the particular address to the parallel inputs of the counter 414. But the counter 411 continues to count 41 nanosecond clock pulses. When it reaches the count 4, the high $Q_C$ output is gated with $Q_D$ inverted by inverter 460 which, in conjunction with the high Q output of flip-flop 430 satisfies AND gate 432 to produce a connection memory 0 write signal CMOWR. Accordingly, the data held in the latches 405, 406 is written into the connection memory 0 at the address held in counter 414. The write signal will be of 162 nanosecond duration because it will remain until the counter 411 advances to the count 8. Upon that occurrence, the gate 432 will be disabled, as will the tri-state drivers 410 by virtue of the high signal on the output $Q_D$ of counter 411. Subsequent 41 nanosecond clock pulses load the counter 414 with all 1's. After CMRST returns low, a scan cycle of all connection memory addresses is accomplished as described initially. At the time the CMOWR signal switched high to write the connection memory, the NOR gate 434 was satisfied to trigger a one shot multivibrator 436 having a nominal period of 800 nanoseconds. The output of the one shot 436 is coupled via NOR gate 438, 437 to the clear input of flip-flops 430, 431, as well as to the clear input of buffer full flip-flop 428. Accordingly, that signal serves to reset those flip-flops, preparing them to receive new connection data from the common control. At the termination of the reset pulse CMRST the latches 441, 444 are clocked as before, ultimately driving the Q of latch 444 low to cause the counter 411 to parallel load all 1's in preparation for the next reset cycle. Network operation continues along the lines described herein, with all time slots being scanned every 125 microseconds, and with a connection being written in the framing interval occurring every 125 microseconds whenever the control complex decides that such a connection should be written.

The mode of operation for writing connections described above is only one of the alternatives available. Using this mode one word of connection memory, that is, one-half of a two party connection can be written during the framing interval. It is also possible to provide additional buffers so that both parts of a connection can be written during frame time. As a further alternative, connections can be written during the sequential scan of all channels. For this mode a comparator is used to compare the latched address for writing with the current address output by the counters 414. When a match is detected, the connection is written.

In addition to the capabilities described thus far, maintenance has the ability to read and write information to and from the network blocks via the CPU B interface. Referring to FIG. 7a there is shown a status selector having data outputs LD0-LD7 and parity LDP for both copy 0 and copy 1 of the high level interface. The information placed on those lines is controlled by three selector bits which address a plurality of 8 bit multiplexers in a status selector 460. It is seen that the selector inputs are the functions CPUAA0-CPUAA2 which originate in the CPU A interface. A particular code on those selector lines in the presence of a network block maintenance read function NBMNTRD will cause the output lines to assume the condition of the selected inputs. For the purpose of clarity, the inputs are indicated by way of the tables shown on FIG. 7e. In effect, the data indicated in the table is coupled to appropriate inputs of the multiplexer such that with the address indicated on the CPUAA lines that data is passed to the output. It is seen that addresses 0-3 select respectively the high order address register, the low order address register, the high order data register and the low order data register. Accordingly, maintenance may access the outputs of those registers to determine that information previously written has been properly received. Address 4 serves to read out maintenance related functions. Bit 0 represents the status of the trouble flip-flop, and bit 1 indicates whether the block in question is a primary or spare. Bit 1 is programmed by strapping the connection related thereto to ground for the regular network blocks and to the positive supply for the spare. Also read out are bit 2 which shows the status of the address parity error flip-flop, bit 3 which shows the status of the data parity error flip-flop, and bits 4 and 5 which show the status of the comparator interface parity error flip-flop on comparator interface boards 0 and 1 respectively. Similarly, bits 6 and 7 read out the status of the parity error flip-flops for connection memory cards 0 and 1 respectively.

Address 5 is used to access the low level clock with bit 0 reading out the status of the trouble flip-flop and bit 2 the status of the error flip-flop. The word responding to address 6 is not currently used. The word selected by address 7 reads out the network block identity for the block in question, with bit 0 being PNBID0, bit 1 being PNBID1 and bit 2 being PNBID2.

The ability of maintenance to write status portions of the network block has been treated previously. Summarizing, addresses 4-7 are utilized for maintenance write operations, with the data bits for write operations being passed through the CPU B interface while addressing is decoded on the CPU A interface. As in the case of maintenance read operations, the bits CPUAA0-CPUAA2 select the particular word. Data bits CPUBD0-CPUBD3 provide the data for the write operation, with function LLCTBFF being equivalent to CPUBD0 for one address. Address 4 accesses the CPU A interface, with CPUDB0 setting the trouble flip-flop, CPUDB1 resetting that flip-flop, and CPUBD3 resetting common error flip-flops on the card. Address 5 accesses the low level clock card with LLCTBFF setting the trouble flip-flop on that card, CPUBD1 resetting it and CPUBD3 resetting the low level clock error flip-flop. As in the case of maintenance read operations, address 6 is not currently used. Address 7 accesses the CPU interface A card. Functions CPUBD0* and CPUBD1* are written only to the spare network block to program PNBID0 and PNBID1, respectively. As described previously function CPUBD2* programs the NBID2 function for all network blocks.

A description of the detailed circuitry of the connection memories and information memories would tend to encumber this disclosure with details not important to an understanding of the invention. Such memory arrangements are known, having been described for example in Pitroda U.S. Pat. No. 4,031,328. It is within the capabilities of one skilled in this art to configure the memory elements and associated components to switch the data passed through the circuitry disclosed in detail herein.

In summary, there has been disclosed a novel network configuration wherein redundancy is supplied for each element in the network but at the cost of only a single spare network block. Since the exemplary embodiment may be configured with as many as four primary blocks, all serviced by a single spare block, the savings will be apparent. Even in smaller systems using less than four primary blocks, the savings are significant since the control remains the same irrespective of the size of the system. In addition, the ability to treat all systems, whether small with only a single primary block, or large with four primary blocks in the same fashion is a significant advantage.

It will be appreciated that switchover from a primary to spare or from spare to a primary is a rather simple operation. Such switchover can be performed by maintenance which has the ability to write latches on the CPU A interface, thereby assigning an identity to the spare block, or by a craftsperson via manual switches which also control those latches. Once switchover is accomplished call processing is unaware of the change, because call processing simply directs instructions for writing connections to a particular address which is now serviced by the spare block in place of the primary (or primary in place of the spare in case of the reverse switch). Accordingly call processing remains the same irrespective of what the network configuration might be.

And maintenance has considerable flexibility to deal with both the on line blocks and the off line block. For example, in a switchover operation, maintenance can perform maintenance call processing writes to the block about to be activated without affecting call processing. Accordingly, the memory map stored by the state processor for a block which is found to be faulty may be used to write the same connections into the spare block before putting it on line. It will be recalled that maintenance call processing write cycles are accomplished by performing write instructions to a particular block with the PNIB2 bit set to 1. If that bit is later switched to 0 while the primary block also remains 0, both blocks can be written in parallel. And finally, due to the fact that the off line block is disabled only at the drivers returning data to the low level multiplexer, the off line block can be exercised and tested. More specifically, even though a block is off line it still has some identity by virtue of the ID bits 0 and 1, even though the disable function prevents that block from affecting the return busses. Accordingly, voice data flowing into the primary block having the same identity as the spare is also flowing through the spare block even though off line. Appropriate parity checks are made to assure that the block is healthy, or alternatively to isolate any faults. And by simply switching PNIB2 high the control complex has the ability to write connections in the off line block during maintenance which is a further aid in fault isolation. In short, although a first impression might indicate that providing only a single spare block would limit flexibility, considerable flexibility is indeed provided.

We claim as our invention:

1. In a telecommunications switching system for selectively interconnecting a plurality of access ports to establish call paths between desired ports and having a stored program common control and a network responsive to the control for establishing the connections, the system being of the type which cyclically samples the access ports to produce digital data words on input busses to the network representative of the sampled information and returns digital data words on output busses from the network for distribution of the information represented thereby to the access ports, the improvement wherein the network comprises a plurality of primary network blocks, each adapted to provide connections to respective assigned groups of the access ports, each block including means for assigning a unique identity code thereto, addressing means responsive to the common control for generating the identity code of a particular network block for accessing that block to write connections therein, a single spare network block having all of the access ports provided thereto, the spare network block having a programmable identity code selectively settable to match the identity code of any of the primary blocks, programmable means for setting the identity code of the spare network block to match the identity code of a faulty network block, programmable means for disabling the faulty network block and enabling the spare network block, whereby the spare network block responds to signals directed to the faulty block to service the group of access ports assigned to said faulty block.

2. The improvement as set forth in claim 1 wherein each network block includes means for multiplexing the input busses from the ports assigned thereto to a common bus for switching, and means for demultiplexing switched data to the output busses, all of said input and output busses being connected to said spare network block, whereby said busses are serviced by the primary block assigned thereto or the spare block under the control of said common control.

3. The improvement as set forth in claim 2 wherein the incoming busses comprise a plurality of cables connected to the associated primary blocks, connecting means effecting connections between the cables and the spare network block such that each cable terminates at its associated primary and also at the spare network block, and means in the primary and spare network block circuitry for splitting the terminating impedances between the primary and spare block, the length of each cable terminating at a primary block being matched to the length of the connecting means which connects that cable to the spare block thereby to minimize reflected energy and provide stable data during a predetermined portion of each data bit.

4. The improvement as set forth in claim 3 wherein the network further includes clock means for producing a clock signal having an operative edge for strobing data into the network, and means for timing the phase of the operative edge to coincide with the time when the data is stable.

5. The improvement as set forth in claim 1 wherein there is provided converter means at the input to each of said network blocks for receiving incoming data from a plurality of input busses and distributing switched data to a plurality of output busses, the converter means of each of the primary network blocks having the busses of the assigned ports coupled thereto, the converter means of the spare network block having all of said busses coupled thereto, the converter means of the spare network block including means for responding to a particular one of said identity codes for causing said spare network block to accept data from one of the groups of input busses and to communicate data to the corresponding group of output busses, each of the blocks including means for disabling said converter means to prevent said block from distributing switched data to the output busses.

6. The improvement as set forth in claim 5 wherein said means for disabling maintains one of said blocks off line, the converter means of said off line block being enabled to accept incoming data but disabled to prevent distribution of switched data, whereby said off line block may be exercised for testing.

7. In a telecommunications switching system for selectively interconnecting a plurality of access ports to establish call paths between desired ports and having a stored program common control and a network responsive to the control for establishing the connections, the system being of the type which cyclically samples the access ports to produce digital data words on input busses to the network representative of the sampled information and returns digital data words on output busses from the network for distribution of the information represented thereby to the access ports, the improvement wherein the network comprises a plurality of primary network blocks, each adapted to provide connections to respective assigned groups of the access ports, each block including means for assigning on a dedicated basis a unique identity code thereto, the common control having a call processing mode and a maintenance mode, addressing means responsive to the common control in the call processing mode for generating the identity code of a particular network block for accessing that block to write connections therein, a single spare network block having all of the access ports provided thereto, the spare network block having a programmable identity code selectively settable to match the identity code of any of the primary blocks, means programmable by the common control in the maintenance mode for setting the identity code of the spare network block to match the identity code of the faulty network block, means programmable by the common control in the maintenance mode for disabling the faulty network block and enabling the spare network block, whereby the spare network block responds to signals directed to the faulty block to service the group of access ports assigned to said faulty block.

8. The improvement as set forth in claim 7 wherein there is provided converter means at the input to each of said network blocks for receiving incoming data from a plurality of input busses and distributing switched data to a plurality of output busses, the converter means of each of the primary network blocks having the busses of the assigned ports coupled thereto, the converter means of the spare network block having all of said busses coupled thereto, the converter means of the spare network block including means for responding to a particular one of said identity codes for causing said spare network block to accept data from one of the groups of input busses and to communicate data to the corresponding group of output busses, each of the blocks including means for disabling said converter means to prevent said block from distributing switched data to the output busses.

9. The improvement as set forth in claim 8 wherein said means for disabling maintains one of said blocks off line, the converter means of said off line block being enabled to accept incoming data but disabled to prevent distribution of switched data, whereby said off line block may be exercised for testing.

10. The improvement as set forth in claim 9 wherein each of said network blocks includes second programmable identification means having a first state for allowing call processing access by said common control and a second state for allowing maintenance call processing access by said common control, said second means being programmable independently of said means for disabling, whereby said common control has call processing access to enabled and disabled network blocks.

11. The improvement as set forth in claim 7 wherein each network block includes means for multiplexing the input busses from the ports assigned thereto to a common bus for switching, and means for demultiplexing switched data to the output busses, all of said input and output busses being connected to said spare network block, whereby said busses are serviced by the primary block assigned thereto or the spare block under the control of said common control.

12. The improvement as set forth in claim 11 wherein the incoming busses comprise a plurality of cables connected to the associated primary blocks, connecting means effecting connections between the cables and the spare network block such that each cable terminates at its associated primary and also at the spare network block, and means in the primary and spare network block circuitry for splitting the terminating impedances between the primary and spare block, the length of each cable terminating at a primary block being matched to the length of the connecting means which connects that cable to the spare block thereby to minimize reflected energy and provide stable data during a predetermined portion of each data bit.

13. The improvement as set forth in claim 12 wherein the network further includes clock means for producing a clock signal having an operative edge for strobing data into the network, and means for timing the phase of the operative edge to coincide with the time when the data is stable.

* * * * *